TRANSISTORIZED MULTIPLE-CHANNEL SIGNAL SWITCHING SYSTEM

Filed April 28, 1961

6 Sheets-Sheet 1

INVENTOR.
THEODOR F. STURM

BY Reed C. Lawlor

ATTORNEY

Feb. 15, 1966 T. F. STURM 3,235,840

TRANSISTORIZED MULTIPLE-CHANNEL SIGNAL SWITCHING SYSTEM

Filed April 28, 1961 6 Sheets-Sheet 2

INVENTOR.
THEODOR F. STURM
BY
Reed C. Lawlor
ATTORNEY

TRANSISTORIZED MULTIPLE-CHANNEL SIGNAL SWITCHING SYSTEM

INVENTOR.
THEODOR F. STURM
BY [signature]
ATTORNEY

TRANSISTORIZED MULTIPLE-CHANNEL SIGNAL SWITCHING SYSTEM

INVENTOR.
THEODOR F. STURM
BY Reed C. Lawlor
ATTORNEY

TRANSISTORIZED MULTIPLE-CHANNEL SIGNAL SWITCHING SYSTEM

Filed April 28, 1961 6 Sheets-Sheet 5

INVENTOR.
THEODOR F. STURM
BY
Reed C. Lawlor
ATTORNEY

Feb. 15, 1966 T. F. STURM 3,235,840

TRANSISTORIZED MULTIPLE-CHANNEL SIGNAL SWITCHING SYSTEM

Filed April 28, 1961 6 Sheets-Sheet 6

INVENTOR.
THEODOR F. STURM
BY Reed C. Lawlor
ATTORNEY 3,235,840

TRANSISTORIZED MULTIPLE-CHANNEL SIGNAL SWITCHING SYSTEM

Theodor F. Sturm, Altadena, Calif., assignor to United Electrodynamics, Inc., Pasadena, Calif., a corporation of California Filed Apr. 28, 1961, Ser. No. 138,538
25 Claims. (Cl. 340—166)

This invention relates to electrical switching circuits employing transistors and more particularly to electronic commutators that employ transistors as switches.

This invention is especially applicable to a commutator or switching arrangement which is employed to connect one of a plurality of electrical units at a time to a common electrical unit. In the most common application of the invention a plurality of signal sources are connected one at a time to a common load circuit. In such a commutator or switching arrangement, transistors have heretofore been employed as gating elements of signal control gate units and means have been employed for applying control voltages to the transistors in such a way that one signal control gate unit is open at a time. Certain difficulties have been experienced heretofore with such gate-control units which are eliminated by this invention.

One difficulty that has arisen in the past has involved the fact that cross-talk has often occurred between different signal channels thus making it impossible to connect only one signal source at a time to the load circuit. In prior efforts to eliminate such cross-talk a separate power supply has been provided for each channel so that no intercoupling of channels occurs through a common power supply.

In accordance with this invention a common power supply is employed for energizing the transistors in different signal channels, but cross-talk is eliminated by isolating the power supply from the load circuit. This power supply is employed to bias on the transistor of the gate that is to be opened and to bias off the transistor of the gates that are to be closed. The resistance of the transistor that is biased on is very small compared with the impedance of the load circuit and the resistances of all the transistors that are biased off are large compared with the resistance of the load circuit. In view of the fact that there is no mutual coupling between the channels other than through the load circuit and the sources, cross-talk between channels is substantially entirely eliminated. This is especially true where, as explained hereinafter, the resistance of a transistor that is biased on is very small, being of the order of 20 ohms, while the resistance of the transistors that are biased off is exceedingly large, being of the order of 10,000 megohms, and the impedance of the load circuit has some intermediate value such as 500 kilohms. For best effect the sources have impedance values less than that of the load circuit.

Another difficulty encountered in the past resides in the fact that when a transistor is biased on a certain internal voltage drop resembling that of a battery, appears between its terminals even though the current flowing through the transistor is very minute. Because of the presence of such an internal transistor voltage, when a transistor is switched on it introduces a spurious voltage signal into the signal channel. While such spurious voltages are very small, they do restrict the amplitude of the signal that can be accurately reproduced and measured to values above a minimum or threshold signal about equal to that of such spurious signal.

According to this invention the effects of such spurious signals are greatly reduced by employing balanced channels in which separate transistors are employed in the two conductors of each signal channel that interconnect each signal source with the load. These two transistors are connected in opposite directions so that the internal transistor voltages introduced by them act in opposite directions. Additionally, in accordance with this invention, the transistors are connected in an inverted manner rather than in a normal manner, thus greatly reducing the internal transistor voltages that are present. In such an inverted connection the biasing voltages employed to bias a transistor on and off are applied between the base and the collector rather than the base and emitter as when a transistor is direct or normally connected. A standard transistor has a current gain $\beta$ that is about unity when it is in an inverted connection but a current gain that is much greater than unity when it is in a direct connection.

Furthermore, in accordance with this invention all of the transistors of the signal control gate units that are connected to one side of the load circuit are biased on and off by voltages provided from one power supply and all of the transistors of the signal control gate units that are connected to the other side of the load circuit are biased on and off by voltages provided from another power supply and the two power supplies are isolated from each other and from the load circuit.

In the most important and practical form of the invention the connection of a large number of signal channels one at a time to a common load circuit is accomplished by means of signal control gates that are arranged in matrix arrays, together with matrix scanners that cause one signal control gate unit at a time to open in each array thus connecting one signal channel at a time to the load circuit. Another feature of this invention resides in the employment of two such matrix arrays with two corresponding matrix scanners for closing one balanced signal channel at a time. Still another feature of the invention resides in the employment of an improved converter for converting pulses from a scale of two to a higher scale as illustrated herein by means of a binary to octal converter. Such converters are employed as matrix scanners.

Another feature of the invention makes use of a single clock pulse source for simultaneously opening signal control gate units in the two matrices that connect the different sides of the load circuit to a single source. Another feature of the invention resides in the provision of an improved power supply system in which two rectifiers that are isolated from each other and from the load circut are employed to provide the biasing potentials for the transistors in different sides of the signal channels. Still another feature of the invention resides in the employment of isolation transformers for isolating the clock pulse source from the matrix scanners and additionally, isolation transformers that isolate the D.C. power supplies employed for biasing the transistors from a common A.C. power source.

Another feature of the invention resides in the employment of novel resetting circuits for recycling the scanning of a matrix so as to economize on the time required for the scanning operation when a fewer number of signal sources are employed than the maximum that are possible, considering the total number of positions at which signal control gate units may be located in the matrices. Still another features of the invention resides in the employment of a resetting circuit with two matrices which cause the scanning cycle to be reinitiated when a reset gate in either matrix is biased on.

The foregoing and other features of the invention together with various advantages thereof are set forth hereinafter with reference to the accompanying drawings in which.

SIMPLE SWITCHING

Figures 1, 2, 3, 4:
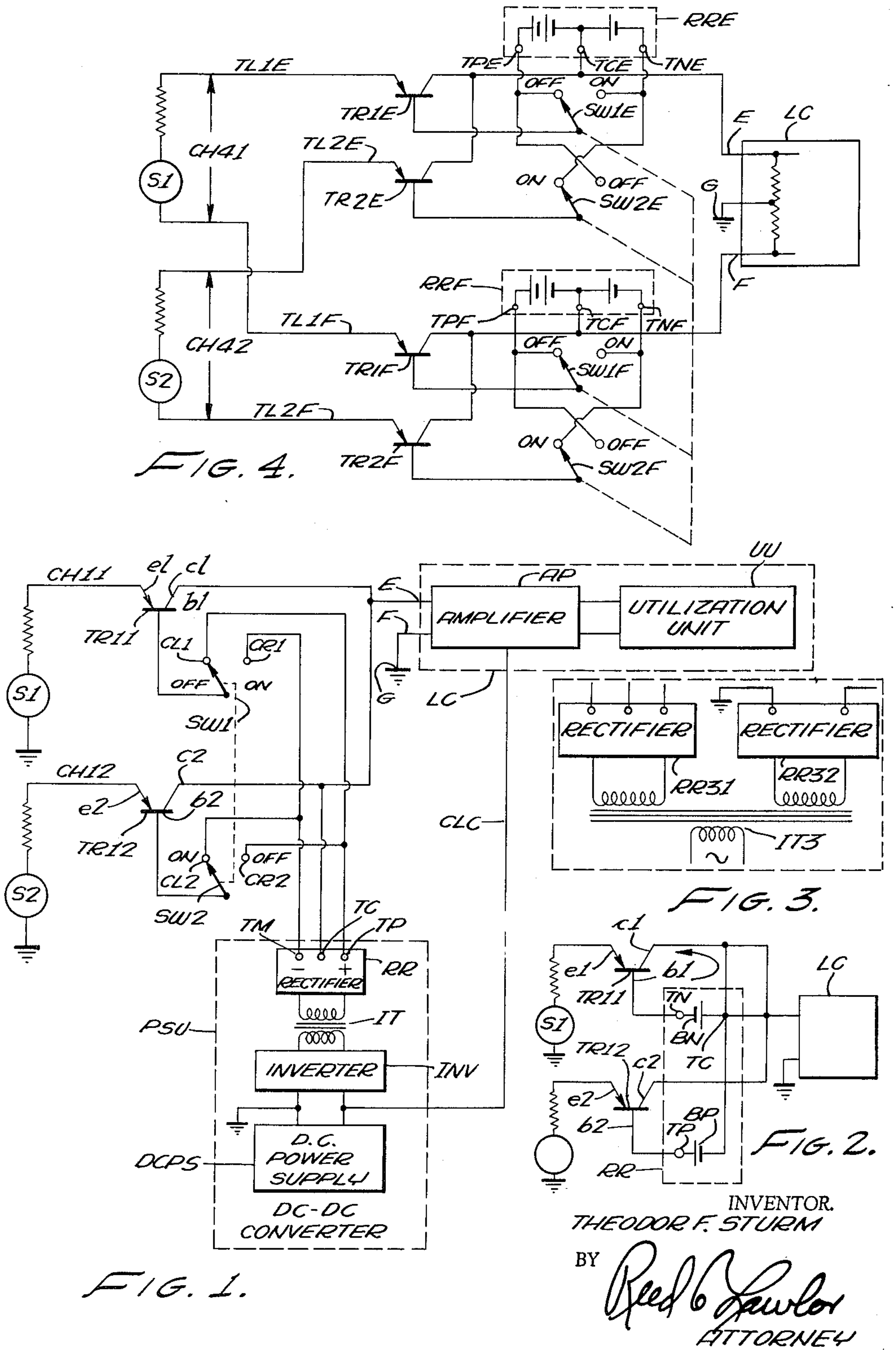
FIGURE 1 is a schematic diagram illustrating a simple form of the invention.
FIGURE 2 is a schematic diagram employed in explaining the operation of the circuit of FIGURE 1.
FIGURE 3 is a diagram of an alternative form of power supply.
FIGURE 4 is a schematic diagram of a form of the invention employing balanced signal channels.

Referring to FIG. 1 there is illustrated a simple arrangement for selectively transmitting signals from a signal source S1 or a signal source S2, to a load circuit LC in accordance with this invention. In the arrangement there illustrated, two control switch elements SW1 and SW2 are employed to selectively transmit signals from one of the sources S1 and S2 respectively to the load circuit LC through pnp transistors TR11 and TR12 respectively. In effect two signals channels CH11 and CH12 are employed to transmit signals from source S1 or source S2 to the load circuit LC. In accordance with one important feature of this invention which is employed in the switching network of FIG. 1, a power supply unit PSU is employed for energizing the two transistors TR11 and TR12 without introducing crosstalk between the signal channels CH1 and CH2. More particularly, except for a very minor transition period, current flows from only one of the sources S1 and S2 at a time thru the corresponding transistor TR11 and TR12 to the load circuit LC. The manner in which the power supply system and switching system and other circuit features make it possible for the two channels CH11 and CH12 to be completely decoupled from each other except for the connections to the common load circuit LC, are explained more specifically hereinafter.

Before explaining the operation of the transistors TR11 and TR12 it is desirable to describe first the power supply unit PSU and the load circuit LC. The load circuit LC comprises an amplifier AP having two signals input terminals, a first input terminal E and a second input terminal F that is connected to ground G. The amplifier is energized by means of suitable conductors CLC that apply D.C. voltages to elements within the amplifier from the power supply unit PSU. The output of the amplifier is connected to a utilization unit UU, such as an oscillograph, magnetic tape recorder, or the like.

The power supply unit PSU includes a D.C. power supply DCPS, an inverter INV, an isolation transformer IT, and a rectifier RR. One terminal of the D.C. power supply DCPS is grounded. One or more ungrounded terminals are connected through the conductors CLC to various elements of the amplifier AP of the load circuit. The D.C. output of the D.C. power supply DCPS is applied to the inverter INV which produces at its output an alternating current voltage which is applied through the isolation transformer IT to the rectifier RR. The rectifier RR itself converts the A.C. voltage applied thereto from the isolation transformer IT to D.C. voltages which are in the form of a neutral, reference or zero voltage at the center output terminal TC; a positive voltage at the output terminal TP, and a negative voltage at the output terminal TM. These D.C. voltages are employed to bias one of the transistors TR11 and TR12 on at a time through the switches SW1 and SW2 in the manner described hereinafter. The arrangement is such that no current flowing from the power supply unit PSU into either of the channels CH1 and CH2 flows into the other channel. With this invention, crosstalk between the channels CH1 and CH2 is substantially completely eliminated.

Each of the transistors is a pnp transistor, which comprises an emitter, a base, and a collector, the transistor TR11 having an emitter *e1*, a base *b1*, and a collector *c1* and the transistor TR12 having an emitter *e2*, a base *b2* and a collector *c2*. In the best embodiment of this invention the only potentials applied to the transistors other than the signal potentials are those that are impressed between the bases and collectors from the power supply unit PSU. In the best embodiment of the invention the transistors are employed with "inverted connections." The advantages of this connection over the normal connection are explained later. As is well known, a pnp transistor in the inverted connection is biased on by applying a potential to its base which is negative relative to its collector, and is biased off by applying a voltage to its base which is positive relative to its collector. In accordance with this invention only one of the transistors is biased on at a time, except for a short transition period as explained hereinafter.

In the switching circuits employed in the form of the invention illustrated in FIG. 1, the two switches SW1 and SW2 are in the form of a pair of ganged single-pole two-position switches. Each of the switches has a left contact and a right contact, the switch SW1 having a left contact CL1 and a right contact CR1 and the switch SW2 having a left contact CL2 and a right contact CR2. In the specific arrangement illustrated, the positive terminal TP of the rectifier RR is connected to the left contact CL1 of the first switch SW1 and to the right contact CR2 of the switch SW2. Also, the negative terminal TM is connected to the right contact CR1 of the switch SW1 and to the left contact CL2 of the second switch SW2. With this arrangement when the two switches are in their left position, the upper transistor TR11 is biased off and the lower transistor TR12 is biased on, and when the switches SW1 and SW2 are in the right position, the upper transistor is biased on and the lower transistor TR12 is biased off.

To aid in understanding the invention, reference is made to FIG. 2 which indicates in a schematic way the circuit connections as they exist while the switches SW1 and SW2 are in their right position. While the switches SW1 and SW2 are in this position the lower transistor TR12 is biased off and the upper transistor TR11 is biased on. Substantially no current flows from the collector *c2* to the base *b2* of the lower transistor TR12 through any circuit whatsoever, but a large current of several milliamperes flows from the collector *c1* to the base *b1* of the upper transistor TR11. While so biased, with the particular transistors employed as mentioned hereinafter, the base to collecter resistance of the upper transistor is about 20 ohms while the base to collecter resistance of the lower transistor is about 10,000 megohms. By virtue of this fact and the fact that the rectifier RR is isolated from ground there is in effect a closed circuit between the base *b1* and the collector *c1* of the upper transistor TR11 and an open circuit between the base *b2* and the collector *c2* of the lower transistor TR12. Furthermore, the input impedance of the load circuit LC is small compared with the open circuit resistance of the transistor TR12 and is large compared with the short circuit resistance of the transistor TR11. Each of the transistors TR11 and TR12 and its associated switch SW1 and SW2 respectively constitutes an electronic gate unit. When either transistor is biased on, the corresponding circuit is closed but the associated signal channel is open. Likewise, when either transistor is biased off, the corresponding circuit is open, but the associated signal channel is closed. For example, when the upper transistor TR11 is biased on in effect the corresponding electronic gate unit and the channel CH11 is opened between the signal source and the load circuit LC and while the lower transistor TR12 is biased off, in effect the corresponding electronic gate unit and the channel CH12 is closed between the source S2 and the load circuit LC. Under these circumstances, a signal is transmitted from source S1 to the load circuit LC but no signal is transmitted from the source S2 to the load circuit.

As indicated in FIG. 2, the rectifier RR is symbolized by means of two batteries, a battery BN which applies a negative voltage to terminal TN relative to the center terminal TC, and a battery BP which applies a positive voltage to the positive terminal TP relative to the center terminal TC. While the circuit is so connected, a relatively large current circulates in the circuit leading from the center terminal TC to the collector *c1* through the base *b1* to the negative terminal TN of the battery BN. It is to be noted that there is no other low resistance circuit connecting the collector *c1* with the base *b1* so that for practical purposes the entire current that flows through the terminals TC and TN also flows through the base *b1* to the collector *c1* of the transistor TR11. Substantially none of this current flows through the load circuit LC or in the transistor TR12.

Under these circumstances, with the switches SW1 and SW2 in their right position, current flows from the emitter *e1* to the collector *c1* and thence through the load circuit LC in an amount that depends upon the voltage supplied from the source S1. The voltage impressed upon the input of the load circuit LC is proportional to the voltage supplied by the source S1. In a similar way, when the switches SW1 and SW2 are in their left position, the polarities of the voltages impressed upon the base elements *b1* and *b2* are reversed, biasing transistor TR11 off and biasing transistor TR12 on. Under the latter condition, signals proportional to the voltage supplied by the source S2 are applied to the input of the load circuit LC.

Each of the sources S1 and S2 may be in the form of a strain gauge elements or a thermocouple that senses a displacement or a change of strain or a change of temperature as the case may be and which develops a voltage in proportion to that change. The sources may also be of any other type which supply voltages, the magnitudes of which indicate a condition or a change in condtion which is to be indicated or recorded or otherwise used in the utilization circuit. In the best embodiment of the invention the internal resistance of the source is very low compared with that of the load. The latter may be of the order of 10 kω to 500 kω where kω=kilohms.

In order to prevent an open circuit at the input of the load circuit LC, make-before-break switch units SW1 and SW2 are employed. Furthermore, while the switch units described in connection with FIG. 1 are of the mechanical type, it will be understood that other types of switch units may be employed such as suitable gating circuits subject to the control of a plurality of switch signal sources as described more fully hereinafter.

In the example represented in FIG. 1, it has been assumed that a D.C. power supply is available and that D.C. power can be supplied directly from it to the load circuit LC. It will be understood, however, that if the primary power source available is in the form of an A.C. power main, the power supply unit PSU may be of the type illustrated in FIG. 3 in which alternating current supplied from a main is applied through an isolation transformer IT3 to two secondary windings to two different rectifiers RR31 and RR32 to provide the voltages required. Other types of power supplies may also be employed.

In one specific embodiment of the invention, Philco transistors type 2N495 were employed and the rectifier RR supplied a positive voltage of 7 volts at the positive terminal TP and a negative voltage of 1 volt at the negative terminal TM. With this arrangement when the transistor was biased off, it had an effective resistance of about 20 ohms between the emitter and the collector, but when the transistor was biased off the effective resistance between the emitter and the collector was about 10,000 megohms. In the former condition, a voltage of 3 mv. was maintained between the emitter and the collector and the current flowing depended upon the voltage supplied from the source in excess of 3 mv. In the latter case, however, the current was extremely small, being of the order of 0.001 μA. at 25° C. and substantially negligible compared with the current corresponding to any significant signal generated in an open transistor.

BALANCED SYSTEM

In FIG. 4 there is illustrated a modified form of the invention which avoids some of the difficulties inherent in the operation of the embodiment illustrated in FIG. 1. In the system of FIG. 4, the effects of offset voltages occurring in the transistors of FIG. 1 are eliminated.

As mentioned, the transistors employed in FIG. 1 utilize inverted connections. In this arrangement the emitter is actually employed as a collector and the collector is actually employed as an emitter. In other words, control current flows through each of the transistors TR11 and TR12 of FIG. 1 from the collector to the base of the transistor and back to the rectifier instead of via the emitter to the base as is normal. When employing the inverted connection when the transistor is biased on, a very small voltage of about 3 mv. is developed between the emitter and the collector. For this reason when a transistor is switched on, a small voltage of this amount appears in the circuit. Consequently it impresses a spurious signal on the load circuit even though no signal is being supplied from the signal source at the input of the transistor. With the arrangement of FIG. 4 no such voltage is impressed on the load circuit. The elimination of such spurious signal voltage is accomplished by employing a switching transistor in each line that connects each source with the load.

In the arrangement of FIG. 4, transistors TR1E and TR2E and associated switching elements, are employed to connect the sources S1 and S2 respectively to the upper terminal E of the load through transmission lines TL1E and TL2E respectively. In a similar manner transistors TR1F and TR2F together with associated switching elements, are employed to connect the sources S1 and S2 respectively to the lower terminal F of the load through transmission lines TL1F and TL2F respectively.

In this case the load has a balanced resistive input with a grounded center tap. Two separate isolated power supplies RRE and RRF here represented symbolically by batteries, are employed for biasing the various transistors on or off as needed. The two power supplies RRE and RRF are isolated from each other and from ground and from all other power supplies in the system.

The center or neutral terminal TCE of the first power supply RRE is connected to the collector of the transistor TR1E. The positive terminal TPE of the first power supply RRE is conected to the left contact of the switch SW1E and to the right contact of the switch SW2E. The negative terminal TNE of the first power supply RRE is connected to the right contact of switch SW1E and to the left contact of the switch SW2E. The switch arm of the switch SW1E is connected to the base of the transistor TR1E while the switch arm of the switch SW2E is connected to the base of the transistor TR2E. Similarly, the center or neutral terminal TCF of the second power supply RRF is connected to the collector of the transistor TR1F. The positive terminal TPF of the second power supply RRF is connected to the left contact of the switch SW1F and to the right contact of the switch SW2F. The negative terminal TNF of the second power supply RRF is connected to the right contact of switch SW1F and to the left contact of the switch SW2F. The switch arm of switch SW1F is connected to the base of the transistor TR1F while the switch arm of the switch SW2F is connected to the base of the transistor TR2F. The four switches SW1E, SW2E, SW1F and SW2F are ganged together so that all of the switches are selectively set in the left position simultaneously or in the right position simultaneously.

When the switches SW1E, SW2E, SW1F and SW2F are set in the left position, the transistors TR1E and TR1F are biased off and the transistors TR2E and TR2F are biased on. But when the switches are in the right position, the transistors TR1E and TR1F are biased on and the transistors TR2E and TR2F are biased off.

When the two transistors TR1E and TR1F are biased on, signals from the source S1 are applied through the channel CH41 including the transmission lines TL1E and TL1F to the respective input terminals E and F of the load circuit LC. Since the two transistors TR1E and TR1F are connected in the same direction in these lines the inherent voltages of about 3 mv. developed by them while each of these transistors is biased on, act in opposite directions in the channel CH41. By matching transistors the voltages developed by the pair of transistors in this channel CH41 balance each other out, so that no offset voltage is introduced by biasing the transistors TR1E and TR1F on or off. In a similar way, no offset voltage is introduced in the channel CH42 that connects the source S2 to the input of the load circuit LC when the transistors TL2E and TL2F are biased on or off. It is to be understood of course that when any pair of transistors is biased off, any potential that might be present in the circuit produces substantially no effect on the load circuit LC because, while the transistors are biased off, they have high effective resistances of about 10,000 megohms. But when the transistors are biased on they have small resistances of only about 20 ohms, thereby making it very important to balance the offset voltages so as to make it possible to detect and accurately measure signals from a source which are smaller than or are of the same order of magnitude as the offset voltages.

ELECTRONIC COMMUTATOR

*Matrix arrays*

Figure 5:
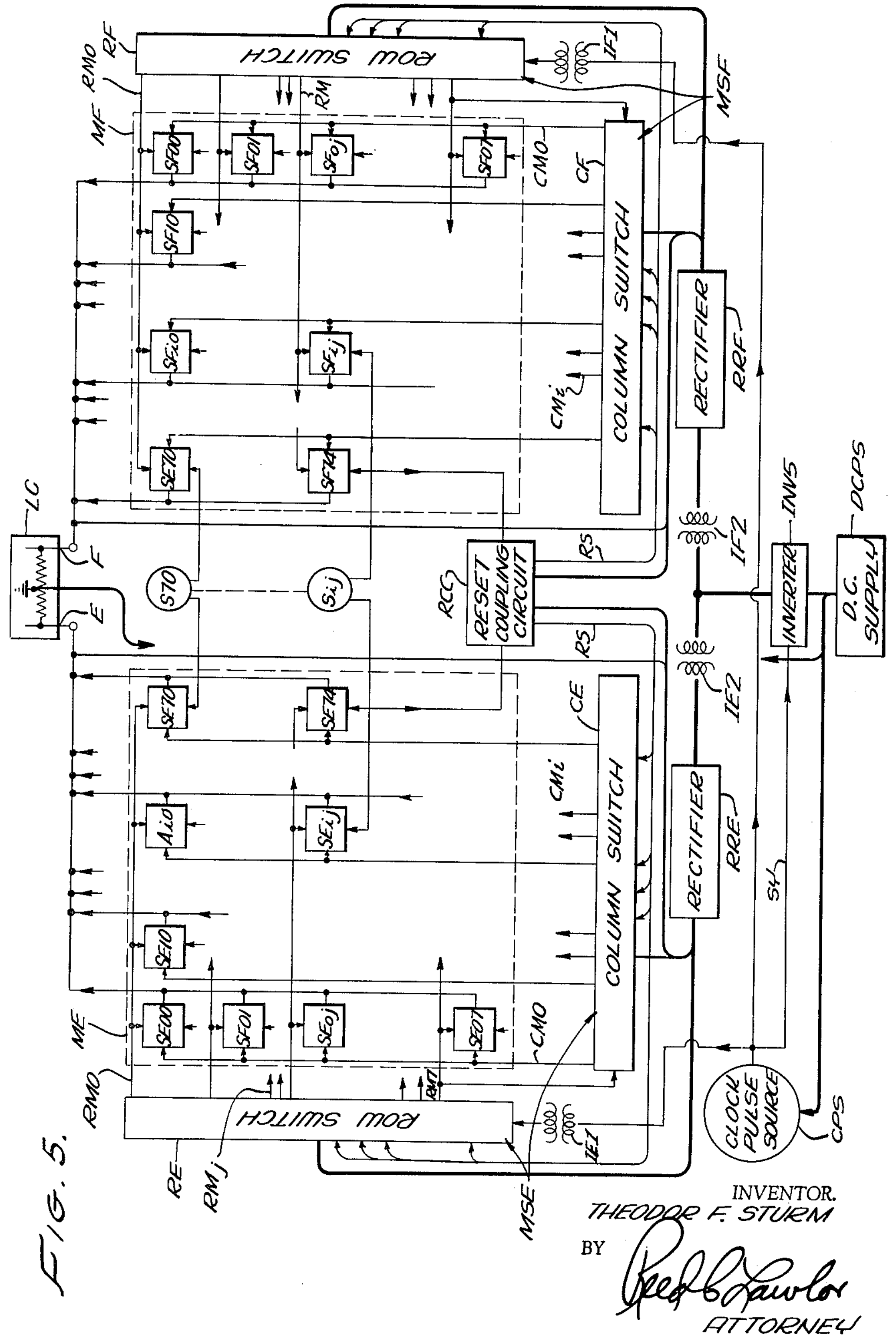
FIGURE 5 is a schematic diagram of an electronic commutator embodying features of this invention.

In FIG. 5 there is illustrated a balanced electronic commutator embodying the present invention for selectively connecting up to sixty (60) signal sources to a common load one at a time. This electronic commutator comprises two pairs of gate control units arranged in two corresponding 8 x 8 matrix arrays ME and MF respectively. Each of the matrix arrays ME and MF comprises sixty (60) gate control units and one reset gate unit arranged at certain of the sixty-four (64) intersections of eight columns and eight rows.

For convenience in identifying the gate units at the various intersections, the gate units of the matrix ME are identified by the symbols SE*ij* and the gate units of the matrix MF are identified by the symbols SF*ij*, where *i* represents the column and *j* represents the row in which each gate unit is located. In this notation the digit *i* may have any one of the values 0, 1, 2, 3, 4, 5, 6 or 7. Likewise the digit *j* may have any one of the values 0, 1, 2, 3, 4, 5, 6 or 7. With this notation each of the gate units is identified by a 2-digit octal number which indicates its position in the matrix. With this particular arrangement of identification symbols, the numbers of the various switch units may be designated in the decimal system by means of the correlations expressed in Table I.

TABLE I

| O | D | O | D | O | D | O | D | O | D | O | D | O | D | O | D |
|---|---|---|---|---|---|---|---|---|---|---|---|---|---|---|---|
| 00 | 1 | 10 | 9 | 20 | 17 | 30 | 25 | 40 | 33 | 50 | 41 | 60 | 49 | 70 | 57 |
| 01 | 2 | 11 | 10 | 21 | 18 | 31 | 26 | 41 | 34 | 51 | 42 | 61 | 50 | 71 | 58 |
| 02 | 3 | 12 | 11 | 22 | 19 | 32 | 27 | 42 | 35 | 52 | 43 | 62 | 51 | 72 | 59 |
| 03 | 4 | 13 | 12 | 23 | 20 | 33 | 28 | 43 | 36 | 53 | 44 | 63 | 52 | 73 | 60 |
| 04 | 5 | 14 | 13 | 24 | 21 | 34 | 29 | 44 | 37 | 54 | 45 | 64 | 53 | 74 | 61 |
| 05 | 6 | 15 | 14 | 25 | 22 | 35 | 30 | 45 | 38 | 55 | 46 | 65 | 54 | 75 | ---- |
| 06 | 7 | 16 | 15 | 26 | 23 | 36 | 31 | 46 | 39 | 56 | 47 | 66 | 55 | 76 | ---- |
| 07 | 8 | 17 | 16 | 27 | 24 | 37 | 32 | 47 | 40 | 57 | 48 | 67 | 56 | 77 | ---- |

In this table the octal numbers are listed in the column headed with "O" while the corresponding decimal numbers are listed in the columns headed with "D" in the same rows as the respective octal numbers. There are sixty signal gate units and one reset gate unit. The signal gate units are identified by the octal numbers 00 . . . 73 and by the decimal numbers 00 . . . 60 while the reset gate units are designated by the octal number 74 and decimal number 61.

In this system there is provision for connection of any one of sixty signal sources S*ij* with the common load circuit LC. Each source S*ij* is connected between the input terminals of the two corresponding gate units SE*ij* and SF*ij*, as indicated in FIG. 5. For example, the source S70 is connected between the input terminals of the two gate units SE70 and SF70.

Each of the signal gate units SE*ij* and SF*ij* is of the type illustrated in FIG. 6 and each of the reset units E74 and F74 is of the type illustrated in FIG. 12 as described in detail hereinafter.

Each of the signal gate units employs a signal input terminal C and a signal output terminal D, a row gating terminal RG and a column gating terminal CG. Each of the gate units is a negative AND gate. In other words, when a negative voltage is applied to both the row and column gating terminals RG and CG, the transistor TR is biased on but when a positive voltage is applied to either the row or the column gating terminal RG or CG or both, the transistor TR is biased off. Thus, each of the signal gate units SE or SF indicated in FIG. 5 acts in the same way as the switching units described in FIGS. 1 and 4, it being understood that in those cases a gating unit includes a transistor and its associated switch.

*Matrix scanners*

Two matrix scanners are employed in the commutator of FIG. 5 in order to switch one pair of gating units SE*ij* and SF*ij* on at a time so as to connect only the corresponding signal source S*ij* at a time to the load circuit LC. Each of the matrix scanners includes a row switch and a column switch.

The row switch RE of each matrix scanner associated with the left matrix array ME is provided with eight row switch terminals RM*j* each of which is connected to the row gating terminal of the switch units in a corresponding row. Thus, each terminal RM*j* of the row switch RE is connected to all the row gating terminals of the gate units SE0*j*, SE1*j* . . . SE*ij* . . . SE7*j* of the left matrix array. For example, one terminal RM0 of the row switch RE of the left scanner is connected to all the row gating terminals of the switch units SE00, SE10, SE20 . . . SE70 of the left matrix array. Likewise, the column switch CE is provided with eight terminals CM$i$, each of which is connected to all of the gate units in a corresponding column. Thus each terminal CM$i$ of the column switch CE is connected to all of the gate units SE$i$0, SE$i$1 . . . SE$ij$ . . . SE$i$7 of the left matrix array. For example, one terminal CMO of the column switch CE is connected to all of the gate units SE00, SE01 . . . SE0$j$ . . . SE07. Both the row switch RE and the column switch CE are so designed that a negative voltage appears on only one terminal at a time, while positive voltages appear on all of its remaining terminals. Thus, since a negative voltage is applied to a row-gating terminal and a column-gating terminal of only one gate unit at a time in the matrix ME, only that gate unit is open and the others are closed.

In a similar way, the row switch RF of each matrix scanner associated with the right matrix MF is provided with eight row switch terminals each of which is connected to the row gating terminal of the switch units in a corresponding row. Thus again, one terminal RM of the row switch RF of the right scanner is connected to all the row gating terminals of the gate units SF0$j$, SF1$j$ . . . SF$ij$ . . . SF7$j$ of the right matrix array. For example, one terminal RMO of the row switch RF of the right scanner is connected to all the row gating terminals of the switch units SF01, SF10, SF20 . . . SF70 of the right matrix array. Likewise, the column switch CF is provided with eight column switch terminals CM$i$, each of which is connected to all of the gate units in a corresponding column. Thus, each terminal CM$i$ of the column switch CF of the right scanner is connected to all of the gate units SF$i$0, SF$i$1 . . . SF$ij$, . . . SF$i$7 of the right matrix. Thus, for example, one terminal CMO of the right column switch CF is connected to all of the gate units SF00, SF01 . . . SF0$j$ . . . SF07. Again, both the row switch RF and the column switch CF are so designed that a negative voltage appears on only one terminal at a time, while positive voltages appear on all of the remaining terminals. Thus, since a negative voltage is applied to a row-gating terminal and a column-gating terminal of only one gate unit at a time in the matrix MF, only that gate unit is open and the others closed.

The row switches and column switches are actuated by means of a series of pulses supplied from a clock-pulse source CPS. Such a clock pulse source supplies trigger pulses at regular intervals such as at a pulse rate of 300 p.p.s. These pulses are applied through isolation transformers IE1 and IF1 to each of the row switches RE and RF respectively. Assuming that initially the gate units SE00 and SF00 are on, this corresponds to a state in which a negative voltage is applied by the row switches RE and RF to the gate units SE00 . . . SE70 and SF00 . . . SF70 in the uppermost rows of the respective matrix arrays ME and MF and in which a negative voltage is applied by the column switches CE and CF to the gate units SE00 . . . SE07 and SF00 . . . SF07 in the outermost rows of the respective matrix arrays ME and MF.

When the next pulse is applied by the clock-pulse source to the two row switches, the voltage applied to the gate units in the first row is changed from negative to positive and the voltage applied by the row switches to the gate units in the second row is changed from positive to negative. As a result, the gate units SW00 and SF00 are turned off, or closed, and the gate units SE01 and SF01 are turned on, or opened. As a result, the source S00 is disconnected from the load circuit LC and the source S01 is connected to the load circuit LC. This process is repeated sequentially as the pulses are applied until after the gate units SE07 and SF07 have both been opened.

Then, when the next pulse is applied to the row switches RE and RF, a pulse is also applied to the column switches CE and CF. At the same time a pulse is transmitted from each of the row switches RE and RF to the corresponding column switch CE and CF respectively. When this occurs the two gate units SE10 and SF10 are opened, connecting the source S10 to the load circuit LC. Thereafter, as pulses are applied to the row switches RE and RF, the gate units SE11 and SF11 and so on in the second column of the two matrices ME and MF are opened one pair at a time until the pair of gate units SE17 and SF17 have been turned on. Thereafter, when the next pulse is applied, the action is switched from the second column of the two matrix arrays ME and MF to the third column, opening the two gate units SE20 and SF20. This process is continued, scanning the matrix units by turning on the respective pairs of gate units in numerical order by their numerical designations as set forth in Table I. In this action, one column is activated at a time in the numerical sequence of the columns and the gate units in each column are opened one at a time beginning at the top and ending at the bottom in each column while that column is activated.

As this sequence is continued, the pair of switch units SE74 and SF74 are finally opened. When the next pulse is applied, reset gate units SE74 and SF74 are energized causing reset pulses to be applied to both of the row switches RE and RF and the column switches CE and CF. The reset pulses restore all of the switches RE, RF, CE and CF to their initial state in which a negative voltage appears in the first row terminals RMO of the row switches RE and RF and the first column terminals CMO of the column switches CE and CF, thereby opening the two gate units SE00 and SF00 in the first columns and first rows of the matrix arrays ME and MF.

*Signal gate units*

Figures 6, 10, 11:
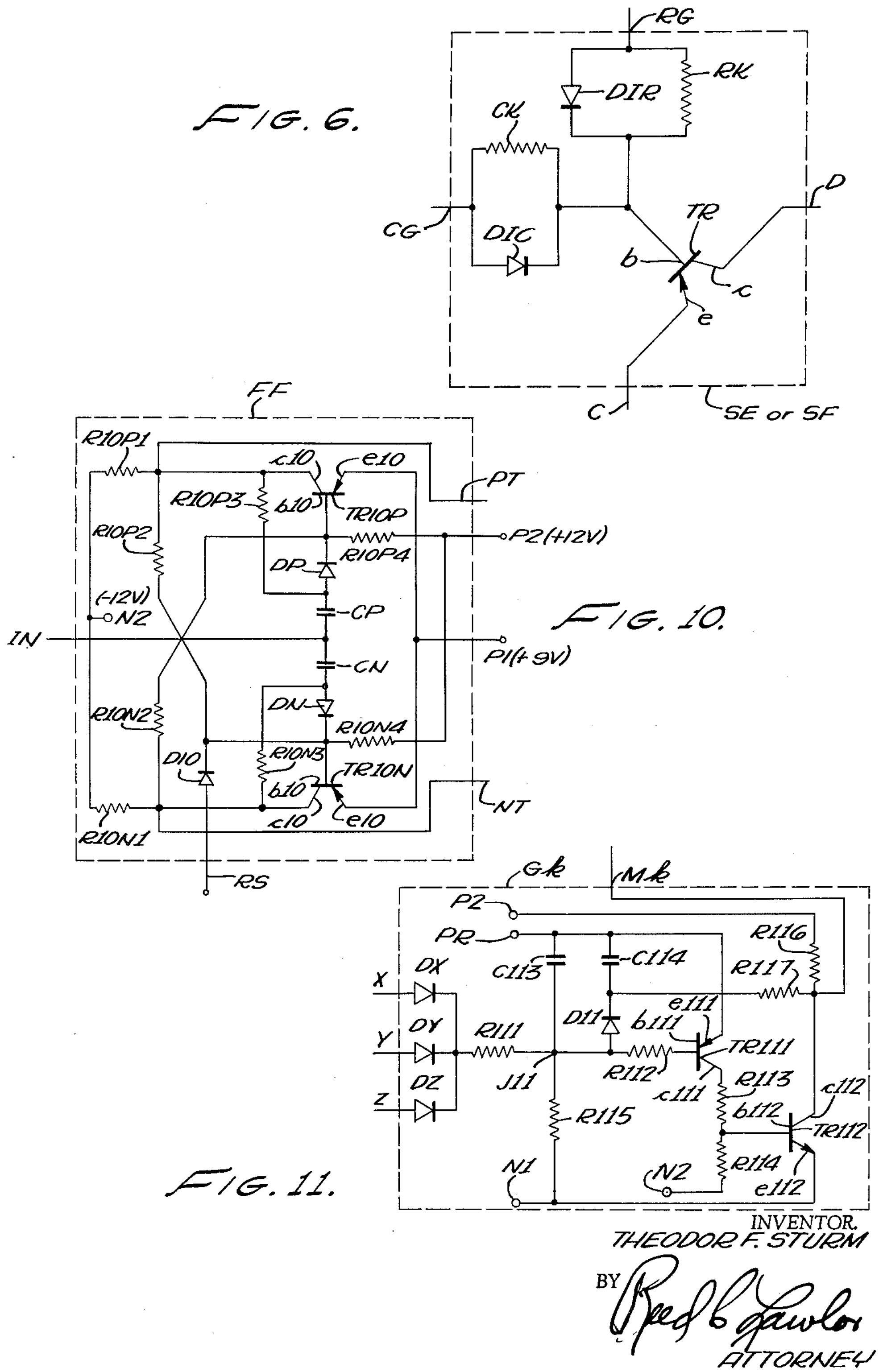
FIGURE 6 is a wiring diagram of a typical signal control gate unit employed as part of the electronic commutator of FIGURE 5.
FIGURE 10 is a wiring diagram of a flip-flop circuit employed in the scanning unit of FIGURE 9.
FIGURE 11 is a block diagram of a control switch gate unit employed in the scanning unit of FIGURE 9.

As shown in FIG. 6, a transistor TR is connected within each of the signal gate units with its emitter *e* connected to the input terminal C and its collector *c* connected to the output terminal D. A diode D1R is connected in the forward direction between the row gating terminal RG and the base *b* of the transistor TR, and a diode D1C is connected in the forward direction between the column gating terminal CG and the base *b* of the transistor TR. Resistors RK and CK are connected in parallel with the diodes D1R and D1C respectively. With this arrangement each of parallel circuits that include the respective diodes D1H and D1C, acts as a leg of a negative AND gate.

*Power supply*

The primary source of power for the electronic commutator of FIG. 5 is a D.C. power supply DCPS. As in the system of FIG. 1, the electronic commutator of FIG. 5 is provided with means for applying D.C. potentials to various elements of the circuitry in such a way that cross-talk between signals channels is substantially eliminated. In other words, with the D.C. voltage isolation arrangement, when any pair of gate units SE$ij$ and SF$ij$ are open, signals are transmitted to the load circuit LC from the correspoding signal source S$ij$. Such cross-talk is eliminated very largely by virtue of the fact that no current paths exist except through the transistors that are on. For this reason, current flows only through the transistors of the gate units that are open and no signal from a closed channel enters an open channel.

In the electronic commutator of FIG. 5, potentials are applied from the D.C. supply DCPS directly to the clock pulse source and also to the load circuit LC as more fully described below. The power supply voltages required for operation of the matrix arrays ME and MF and their corresponding matrix scanners MSE and MSF and the reset coupling circuit RCC are provided by two isolated power supplies including rectifiers RRE and RRF. Power to these rectifiers is supplied by the D.C. supply, DCPS thru an inverter INV5 and isolation transformers IE2 and IF2. In the inverter INV5, D.C. current drawn from the D.C. power supply DCPS is converted to square-wave alternating current at a relatively high frequency of about 5000 c.p.s. that is very high compared with the frequency of the clock-pulse source CPS. Current from the inverter INV5 is transferred to the inputs of the two rectifiers RRE and RRF through the two isolation transformers IE2 and IF2. Each of these rectifiers converts the 5000 c.p.s. current applied thereto into D.C. voltages of various values as required to energize the various parts of the matrix scanners and the reset coupling circuit.

Figures 7, 8:
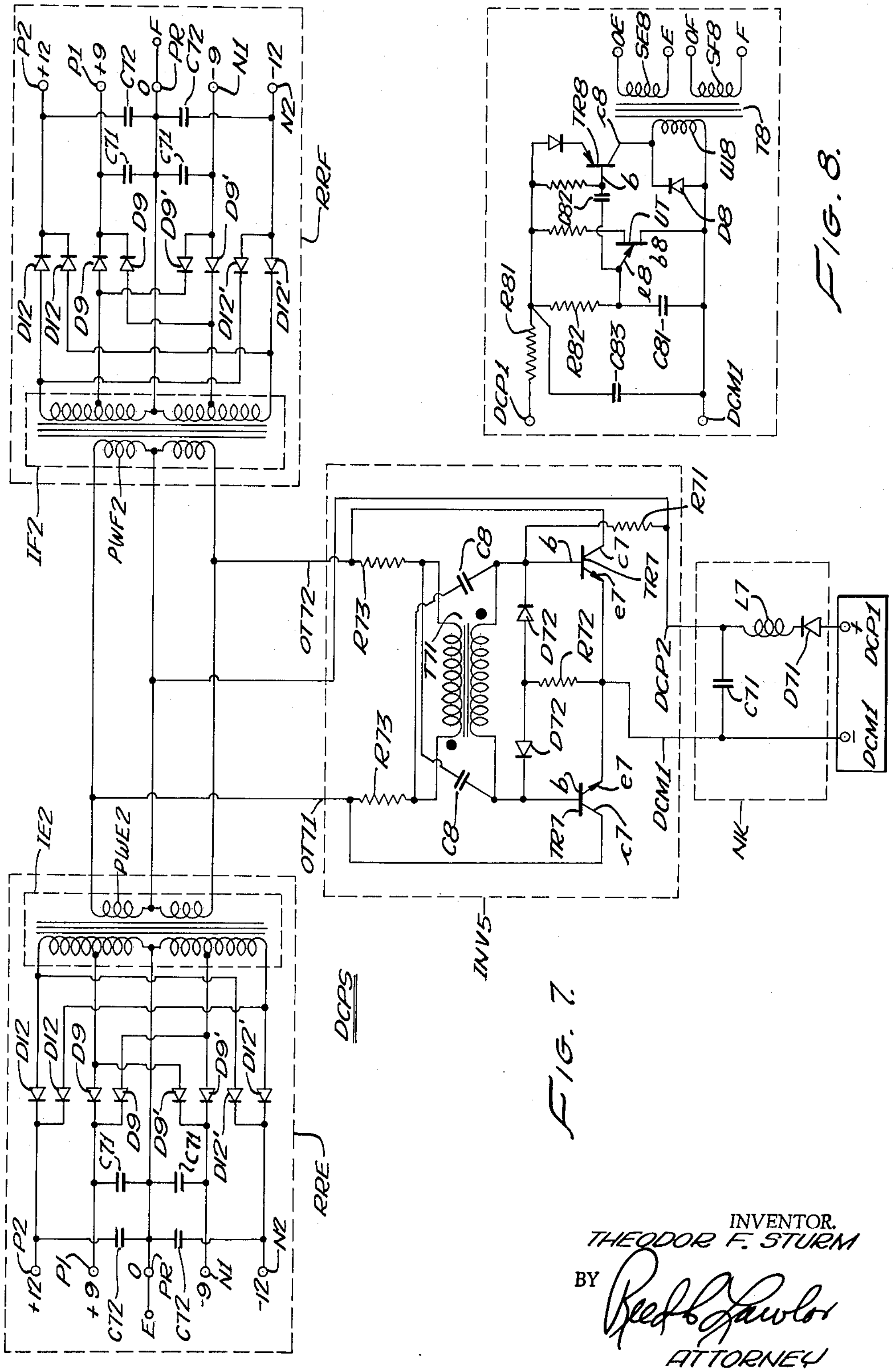
FIGURE 7 is a wiring diagram of a power supply employed with the electronic commutator of FIGURE 5.
FIGURE 8 is a wiring diagram of the clock pulse source employed in the electronic commutator of FIGURE 5.

A specific power supply system suitable for use with the electronic commutator of FIG. 5 is illustrated in FIG. 7 in more detail. In the system shown there, a protective network NK is connected between the D.C. power supply DCPS and the remainder of the circuit. The protective network NK is permanently connected to the inverter INV5 and is so arranged that the inverter is protected against any accidental reversal in the polarity due to improper connection of the D.C. power supply. For this purpose, a diode D71 is connected in the positive voltage line with its anode connected directly to the positive terminal DCP1 of the D.C. power supply. An inductor L7 is connected between the diodes D71 and the positive input terminal DCP2 of the inverter. The negative input terminal DCM1 of the inverter is connected directly to the negative terminal DCM1 of the D.C. power supply DCPS. A by-pass capacitor C71 is connected directly across the two power supply terminals of the inverter. The inductor L7 and the capacitor C71 aid in attenuating the transmission of transients from the D.C. power supply DCPS to the inverter and vice versa.

The inverter itself comprises a balanced chopper or oscillator of conventional type. In the inverter INV5 the emitters *e*7 of two npn transistors TR7, are connected to the negative terminal DCM1, the base *b* of one of the transistors is connected through the resistor R71 to the positive terminal DCP2. Two diodes D72 are connected back-to-back between the bases *b* of the two transistors with their cathodes connected directly to the bases. The junction between the anodes is connected through a resistor R72 to the two emitters *e*7. One winding of a coupling transformer T71 is connected between the bases *b*, while the other winding is connected through resistors R73 to the collectors *c*7 of the two transistors TR7. Bypass capacitors C8 are connected between adjacent terminals of the two windings of the transformer T71 and the transformer is so connected that a phase reversal occurs as indicated by the polarity or phase dots.

The circuit constants of the various elements employed in the isolation network NK and the inverter INV5 may have the following typical specifications and values.

C71=15 $\mu$fd.
D71=1N645
L7=150 $\mu$H
R71=110 k$\omega$
TR7=2N657
D72=IN645
R72=360 $\omega$
R73=51 $\omega$
C8=0.01 $\mu$fd.
T71=1 to 1 ratio With this arrangement, when a power supply DCPS providing 28 volts D.C. is employed, a square-wave voltage having a swing amplitude, that is a difference in amplitude from one side to the other, of about 110 volts, is produced at the output terminals OT71 and OT72 of the inverter INV5. This square-wave voltage is applied through the isolation transformers IE2 and IF2 to provide suitable rectified voltages as needed by the various elements of the matrix scanners.

As illustrated in FIG. 7, the isolation transformers IE2 and IF2 are, for convenience, deemed to be parts of the corresponding rectifiers RRE and RRF. Each of the isolation transformers includes a center-tapped primary and two secondary windings. Each of the secondary windings of each isolation transformer IE2 and IF2 has an intermediate tap as explained hereinafter and one end of one secondary winding is connected to one end of the other secondary winding as explained hereinafter. The center taps of the primary windings PWE2 and PWF2 of the isolation transformers IE2 and IF2 are connected through the choke L7 and the diode D71 to the positive terminal DCP1 of the direct-current power supply DCPS. One end of each of the primary windings PWE2 and PWF2, is connected to the output terminal OT71 of the inverter INV5 and the remaining ends of the two primary windings PWE2 and PWF2, are connected to the other output terminal OT72 of the inverter INV5. The two sections of each primary winding are bifilar wound so that the coupling coefficient between them is very nearly unity. As a result, the voltages across the two sections of each primary winding are equal even though the inverter INV5 be slightly asymmetrical or unbalanced. Likewise, the two secondary windings of each of the isolation transformers IE2 and IF2 are bifilar wound so as to equalize the voltages appearing across them. As indicated in FIG. 7, the rectifiers produce supply voltages of +12, +9, 0, −9 and −12 volts at output terminals P2, P1, PR, N1, and N2 respectively. In this connection it will be understood that where reference is made to positive and negative voltages applied to various portions of the matrix scanners MSE and MSF, the reset coupling circuit RCC, and the load circuit LC, the voltages are referred to the voltages at the reference voltage terminals PR as 0. In order to produce such supply voltages, the two ends of each of the secondary windings of each isolation transformer, are connected together as shown and intermediate taps are appropriately located on the secondary windings to produce the desired voltages at the output terminals P2, P1, PR, N1 and N2.

Referring to FIG. 7 it will be noted that two diodes D12 are arranged with their anodes connected to the outer ends of the two secondary windings and with their cathodes connected to the terminal P2. Also two diodes D9 are arranged with their anodes connected to the intermediate terminals of the secondary windings and with their cathodes connected to the terminals P1. In addition, two diodes D12′ are arranged with their cathodes connected to the outer ends of the two secondary windings and with their anodes connected to the terminal N2 and that two diodes D9′ are arranged with their cathodes connected to the intermediate terminals of the secondary windings and their anodes connected to the terminals N1. It will be noted that filter condensers C72 are connected between the reference terminal PR and the two terminals P2 and N2 and also that filter condensers C71 are connected between the reference terminal PR and the two terminals P1 and N1.

The terminals P2, P1, PR, M1 and M2 of the left rectifier PRE are connected to various points of the left matrix scanner MSE and to the left portion of the reset coupling circuit RCC. Likewise, the terminals P2, P1, PR, M1 and M2 of the right rectifier RRF are connected to various points of the right matrix scanner MSF and to the right portion of the reset coupling circuit RCC. The reference terminal PR of the left rectifier RRE is connected to the left input terminal E of the load circuit LC while the right rectifier RRE is connected to the right input terminal F of the load circuit LC. With the arrangement described complete D.C. isolation is achieved between all of the parts associated with the left matrix array ME and all the parts associated with the right matrix array MF except for the impedance interconnection through the input of the load circuit LC and the signal source which is connected to the load circuit input at the time. Furthermore, as explained previously in connection with FIG. 2, the effective resistance of the transistor that is on is so low and the resistance of the transistor that is off is so high compared with the input impedance of the load circuit that cross-talk does not occur between channels.

*Clock pulse source*

A clock-pulse source of the type that is suitable to employ in triggering the matrix scanners MSE and MSF, is shown in FIG. 8. This clock-pulse source is of the general type described under the heading "Unijunction Transistor Circuits" of the General Electric Transistor Manual, Fourth Edition, 1959.

The pulse generator includes a unijunction transistor UT energized through suitable circuitry by a positive potential supplied from the positive terminal DCP1 and a negative potential supplied from the negative terminal DCM1 of the D.C. power supply DCPS of FIG. 7. With this circuit D.C. current supplied through the resistor R81 charges the capacitor C81 through resistor R82. The capacitor which is connected to the emitter *e8* of the unijunction transistor UT causes the transistor UT to fire periodically when the potential across the capacitor C81 attains the firing potential. Each time the unijunction transistor fires the resistance between its emitter *e8* and its base terminal *b8* drops to a low value causing the capacitor C81 to discharge rapidly. When the discharge of the capacitor discontinues this resistance rises, restoring the firing potential of the transistor, thus permitting the capacitor C81 to become charged again by the current flowing thereto through resistor R82.

Signals periodically developed at the emitter *e8* are applied through a coupling capacitor C82 to the base of an amplifying transistor TR8. With this arrangement pulses are developed periodically in the primary winding W8 of a transformer T8. The primary winding is connected between the collector *c8* of the amplifying transistor TR8 and the negative terminal DCM1. A diode D8 having its anode connected to the negative terminal DCM1 and its cathode connected to the collector *c8* of the amplifying transistor TR8 prevents the signal in the primary winding W8 from ringing. With this arrangement pulses of very short duration such as a few microseconds are developed periodically in the secondary windings SE8 and SF8. The pulse repetition rate depends in part upon the value of the resistor R82 and the value of the capacitor C81, the pulse repetition rate being readily established at 300 p.p.s. by suitable selection of circuit constants.

The lower terminals of the secondary windings SE8 and SF8 are connected to the input terminals E and F respectively of the load circuit LC and the upper terminals OE and OF are connected to the inputs of the row switches RE and RF, respectively. It is to be noted that the lower terminals E and F are in effect connected to the neutral terminals PR of the corresponding rectifiers RRE and RRF. The secondary windings SE8 and SF8 are so polarized that positive pulses appear periodically at their upper terminals OE and OF thereby applying positive pulses periodically to the corresponding matrix scanners MSE and MSF as required to operate the scanners to scan the corresponding matrix arrays ME and MF. It is to be noted that each matrix is scanned at a "frame" frequency that is equal to the pulse repetition rate divided by the number of gating units in each of the matrix arrays. In this particular case, the frame frequency is 300/60=5, that is, each matrix is scanned at the rate of 5 times per second. The primary winding W8 and the secondary winding SE8 together constitute the isolation transformer IE1 of FIG. 5 while the primary winding W8 and secondary winding SF8 constitute the isolation transformer IF1 of FIG. 5.

As mentioned above, one end of the secondary winding SE8 is connected to one input terminal E of the load circuit and one end of the secondary winding SF8 is connected to the other input terminal F of the load circuit. The terminal E is thus also connected to the neutral or reference terminal PR of the left rectifier RRE and the terminal F is also connected to the neutral or reference terminal PR of the right rectifier RRF. With this circuit the positive pulses from the output terminal OE are employed to trigger the left matrix scanner MSE and the positive pulses from the output terminal OF are employed to trigger the right matrix scanner MSF.

*Scanning switches*

Figure 9:
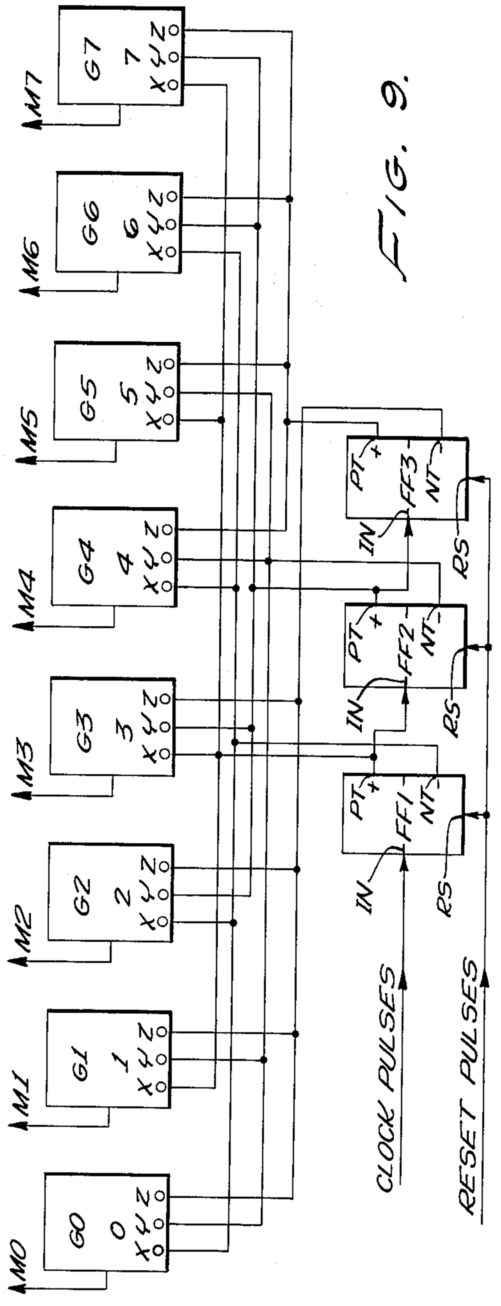
FIGURE 9 is a block diagram of a typical scanning unit employed in the matrix scanners of the electronic commutator of FIGURE 5.

As previously indicated and as illustrated in FIG. 5, each of the matrix scanners MSE and MSF includes a row switch and a column switch. While other types of row and column switches may be employed with the switching units of the matrix arrays ME and MF, a switch of the type which has proved to be admirably suited for use in this invention is illustrated in FIGS. 9, 10, and 11. The scanner switch of FIG. 9 employs a binary to octal converter, including three flip-flop units FF1, FF2, and FF3, and in addition eight gate or control switch units G0, G1, . . . G7.

Each of the flip-flop circuits is provided with an input terminal IN and a positive or "1" (one) output terminal PT, and a negative or "0" (zero) output terminal NT. The flip-flop units are also provided with reset terminals RS. A specific flip-flop circuit suitable for use in this invention is illustrated in FIG. 10.

Each of the control switch units G0 . . . G7 includes corresponding output terminals M0 . . . M7. Each control switch unit also includes three input terminals X, Y and Z to three legs of a negative AND gate. A gate unit suitable for use in this invention is illustrated in FIG. 11.

In order to achieve binary-to-octal conversion the outputs of the three flip-flop circuits FF1, FF2 and FF3 are connected to the inputs of the converter circuits in a particular way. The positive output terminal PT of the flip-flop unit FF1 is connected to the input legs X of the gate units G1, G3, G5 and G7. The positive output terminal PT of the flip-flop unit FF2 is connected to the input legs Y of the gate units G2, G3, G6 and G7. The positive output terminal PT of the flip-flop unit FF3 is connected to the input legs Z of the gate units G4, G5, G6 and G7. The negative output terminal NT of the flip-flop unit FF1 is connected to the input legs X of the gate units G0, G2, G4 and G6. The negative output terminal NT of the flip-flop unit FF2 is connected to the input leg Y of the gate units G0, G1, G4 and G5. The negative output terminal NT of the flip-flop unit FF3 is connected to the input legs Z of the gate units G0, G1, G2 and G3.

In the binary-to-octal converter it will be noted that each output terminal of each flip-flop unit is connected to gate legs of a different set of gate units and one gate leg of each gate unit is connected to an output terminal of a different flip-flop unit.

In addition, the input IN of the first flip-flop unit FF1 is connected to the source of clock pulses. The input of the second flip-flop unit is connected to the positive terminal PT of the first flip-flop unit FF1, and the input of the third flip-flop unit is connected to the positive terminal PT of the second flip-flop unit FF2. All of the reset terminals RS of the flip-flop units FF1, FF2 and FF3 are connected to a source of reset pulses.

With this system the voltage at the gate leg inputs X of the gate units G1, G3, G5 and G7 is always of the same polarity as the voltage of the upper output terminal PT of the first flip-flop unit FF1. Similarly, the voltage at the gate leg inputs X of the gate units G0, G2, G4 and G6 is always of the same polarity as the voltage of the lower output terminal NT of the first flip-flop unit FF1. Similarly, the voltage at the gate leg inputs Y of the gate units G2, G3, G6 and G7 is always of the same polarity as the voltage of the upper output terminal PT of flip-flop unit FF2. Similarly, the voltage at the gate leg inputs Y of the gate units G0, G1, G4 and G5 is always of the same polarity as the voltage of the lower output terminal NT of flip-flop unit FF2. Similarly, the voltage at the gate leg inputs Z of the gate units G4, G5, G6 and G7 is always of the same polarity as the voltage of the upper output terminal PT of the flip-flop unit FF3. And similarly, the voltage at the gate leg inputs Z of the gate units G0, G1, G2 and G3 is always of the same polarity as the voltage of the lower output terminal NT of the flip-flop unit FF3.

With the specific scanning switch of FIG. 9, all the flip-flop units FF1, FF2 and FF3 are restored to their 0 state by the application of a positive reset pulse to the three input reset terminals RS. When so restored, a steady negative voltage appears at the output of each of the negative terminals NT. The negative voltages from the flip-flop units FF1, FF2 and FF3 are applied to the gate legs X, Y and Z of the gate unit G0, operating this gate to produce a negative voltage at its output M0. With the scanning switch of FIG. 9 in this condition, a cycle of binary to octal conversion commences when eight clock pulses of a series are applied. Eight clock pulses are employed during each cycle to cause the voltages appearing at the outputs M0 . . . M7 of the eight gate units G0 . . . G7 respectively to become negative one at a time in the order mentioned.

More particularly, at the commencement of the cycle of operation, as mentioned above, negative voltages are provided at the lower terminals of the three flip-flop units FF1, FF2, and FF3 while positive voltages appear at the upper terminals PT of the three flip-flop units FF1, FF2 and FF3 thus applying negative voltages to the three gate inputs X, Y and Z to the three gate legs of the gate unit G0 and a positive voltage to at least one of the inputs of the gate legs of all of the remaining gate units. As a consequence while the scanning switch is in this condition a negative voltage appears at the output M0 of only the gate unit G0.

Commencing from this condition when a *first* clock pulse is applied to the input terminal IN of the first flip-flop unit FF1, the voltage at its lower output terminal NT changes from negative to positive and the voltage at its upper output terminal PT changes from positive to negative. The change in voltage of the upper terminal PT of the first flip-flop unit FF1 applies a positive pulse to the input IN of the second flip-flop unit FF1 causing the voltage at its lower output terminal NT to change from negative to positive and the voltage at its upper output terminal PT to change from positive to negative. As a result, negative voltages are applied to the three gate inputs X, Y and Z to the three gate legs of the gate unit G1 and a positive voltage to at least one of the inputs of the gate legs of all the remaining gate units. As a consequence, while the scanning switch is in this condition, a negative voltage appears at the output M1 of only the gate unit G1.

When a *second* clock pulse is applied to the input terminal IN of the first flip-flop unit FF1, the voltage at its lower output terminal NT changes from positive to negative and the voltage at its upper output terminal PT changes from negative to positive. As a result, negative voltages are applied to the three gate inputs X, Y and Z to the three gate legs of the gate unit G0 and a positive voltage to at least one of the inputs of the gate legs of all the remaining gate units. As a consequence, while the scanning switch is in this condition a negative voltage appears at the output M2 of only the gate unit G2.

When a *third* clock pulse is applied to the input terminal IN of the first flip-flop unit FF1, the voltage at its lower output terminal NT changes from negative to positive and the voltage at its upper output terminal PT changes from positive to negative. As a result, negative voltages are applied to the three gate inputs X, Y and Z to the three gate legs of the gate unit G3 and a positive voltage to at least one of the inputs of the gate legs of all the remaining gate units. As a consequence, while the scanning switch is in this condition a negative voltage appears at the output M3 of only the gate unit G3.

Commencing from this condition when a *fourth* clock pulse is applied to the input terminal IN of the first flip-flop unit FF1, the voltage at its lower output terminal NT changes from positive to negative and the voltage at its upper output terminal PT changes from negative to positive. The change in voltage of the upper terminal PT of the first flip-flop unit FF1 applies a positive pulse to the input IN of the second flip-flop unit FF2 causing the voltage at its lower output terminal NT to change from positive to negative and the voltage at its upper output terminal PT to change from negative to positive, the change in voltage of the upper terminal PT of the second flip-flop unit FF1 applies a positive pulse to the input IN of the third flip-flop unit FF3 causing the voltage at its lower output terminal NT to change from negative to positive and the voltage at its upper output terminal PT to change from positive to negative. As a result, negative voltages are applied to the three gate inputs X, Y, and Z to the three gate legs of the gate unit G4 and a positive voltage to at least one of the inputs of the gate legs of all the remaining gate units. As a consequence, while the scanning switch is in this condition a negative voltage appears at the output M4 of only the gate unit G4.

Commencing from this condition when a *fifth* clock pulse is applied to the input terminal IN of the first flip-flop unit FF1, the voltage at its lower output terminal NT changes from negative to positive and the voltage at its upper output terminal PT changes from positive to negative. As a result negative voltages are applied to the three gate inputs X, Y and Z to the three gate legs of the gate unit G5 and a positive voltage to at least one of the inputs of the gate legs of all the remaining gate units. As a consequence, while the scanning switch is in this condition, a negative voltage appears at the output M5 of only the gate unit G5.

When a *sixth* clock pulse is applied to the input terminal IN of the first flip-flop unit FF1, the voltage at its lower output terminal NT changes from positive to negative and the voltage at its upper output terminal PT changes from negative to positive. The change in voltage of the upper terminal PT of the first flip-flop unit FF1 applies a positive pulse to the input IN of the second flip-flop unit FF1 causing the voltage at its lower output terminal NT to change from negative to positive and the voltage at its upper output terminal PT to change from positive to negative. As a result negative voltages are applied to the three gate inputs X, Y and Z to the three gate legs of the gate unit G6 and a positive voltage to at least one of the inputs of the gate legs of all the remaining gate units. As a consequence, while the scanning switch is in this condition, a negative voltage appears at the output M6 of only the gate unit G6.

When a *seventh* clock pulse is applied to the input terminal IN of the first flip-flop unit FF1, the voltage at its lower output terminal NT changes from negative to positive and the voltage at its upper output terminal PT changes from positive to negative. As a result negative voltages are applied to the three gate inputs X, Y and Z to the three gate legs of the gate unit G7 and a positive voltage to at least one of the inputs of the gate legs of all the remaining gate units. As a consequence, while the scanning switch is in this condition a negative voltage appears at the output M7 of only the gate unit G7.

When an *eighth* clock pulse is applied to the input terminal IN of the first flip-flop unit FF1, the voltage at its lower output terminal NT changes from positive to negative and the voltage at its upper output terminal PT changes from negative to positive. The change in voltage of the upper terminal PT of the first flip-flop unit FF1 applies a positive pulse to the input IN of the second flip-flop unit FF2 causing the voltage at its lower output terminal NT to change from negative to positive and the voltage at its upper output terminal PT to change from positive to negative. The change in voltage of the upper terminal PT of the second flip-flop unit FF2 applies a positive pulse to the input IN of the third flip-flop unit FF3 causing the voltage at its lower output terminal NT to change from positive to negative and the voltage at its upper output terminal PT to change from negative to positive. As a result negative voltages are again applied to the three gate inputs X, Y and Z to the three gate legs of the gate unit G0 and a positive voltage to at least one of the inputs of the gate legs of all the remaining gate units. As a consequence, while the scanning switch is in this condition a negative voltage again appears at the output M0 of only the gate unit G0.

Thus, after eight pulses have been applied, the binary-to-octal converter of FIG. 9 is restored to its initial condition in which the output terminal M0 of the gate unit G0 is negative and the output terminals of all the other gate units G1 . . . G7 are positive. Thereafter, as clock pulses continue to be applied, the binary-to-octal conversion cycle is repeated over and over. Thus, the output terminals M0 . . . M7 of the eight gate units G0 . . . G7 become negative, one at a time, over and over in the order mentioned.

As indicated, each of the row switches RE and RF and each of the column switches CE and CF is in the form of a binary-to-octal converter of the type represented in FIG. 9. Clock pulses are applied through the isolation transformers IF1 and IE1 to the row switches RE and RF from the clock-pulse source CPS to cause the row switches to produce negative voltages at their output terminals, M0, M1 . . . M7 repeatedly, one at a time. As indicated in FIG. 5, the output RM7 of each of the row switches RE and RF is connected to supply a positive clock pulse to the corresponding column switch CE and CF at the completion of each cycle of operation of the row switches RE and RF.

Thus, as each of the matrix scanners MSE and MSF operates, negative voltages are applied to both of the input legs of only one gate unit at a time of each matrix array ME and MS. As a result, the matrix gate units of the first columns of the two matrices open one at a time in numerical order. Then the matrix gate units of the second columns of the two matrices open one at a time in numerical order. This process is then repeated for the third columns of the two matrices, then for the fourth columns, then for the fifth columns, then for the sixth columns, then for the seventh columns, and then for the eighth columns. However, the operation of the entire system is interrupted when negative bias voltages are applied to the two gate legs of the reset switches SE75 and SF75 that are located in the eight columns and the fifth rows of the two matrix arrays ME and MF. Such interruption occurs in each sequence of sixty pulses from the clock source CPS applied to the matrix scanners MSE and MSF. When this interruption occurs, a positive pulse is transmitted from either of the two reset switch units SE74 or SF74, whichever occurs earlier, through the reset coupling circuit to the reset terminals RS of all of twelve flip-flop units present in the two row switches RE and RF and the two column switches CE and CF. This reset pulse restores all of the scanner switches RE, RF, CE and CF to their initial condition in which negative voltages appear at the outputs of their first gate units G30. Thus, at the completion of each sequence of sixty pulses applied from the clock pulse source CPS, the two matrix arrays ME and MF are restored to their initial conditions in which only the gate units SE00 and SF00 are open.

*Flip-flop circuits*

A typical flip-flop circuit FF is illustrated in FIG. 10. The circuit there illustrated comprises upper and lower transistors TR10P and TR10N. Power is supplied to the flip-flop circuit FF from the terminals P2, P1 and N2 of the power supplies. More particularly, power is supplied from the power supply RRE to all of the flip-flop units of the left matrix scanner MSE and power is supplied from the power supply RRF to all of the flip-flop units of the right matrix scanner MSF. In all cases, the emitters e10 of the transistors TR10P and TR10N are connected to the appropriate power supply terminal P1. The collectors of the transistors TR10P and TR10N are connected through appropriate current-limiting resistors R10P1 and R10N1 to the appropriate −12 volt terminal N2. The collector c10 of each transistor TR10P and TR10N is connected through a corresponding feedback resistor R10P2 and R10N2 to the base of the other transistor, TR10N and TR10P respectively. The base b10 of the upper transistor TR10P is connected to the appropriate +12 volt terminal N2 through resistors R10P4. The base b10 of the lower transistor is connected to the same +12 volt terminal N2 through resistors R10N4. The input terminal IN is connected through two coupling capacitors CP and CN through the corresponding steering diode DP and DN to the bases of the upper and lower transistors TR10P and TR10N respectively. The reset terminal RS is connected through a reset diode D10 to the base of the lower transistor TR10N. The various elements of a typical flip-flop circuit FF have the properties and specifications set forth below:

CP, CN=150 μμfd.
R10P1, R10N1=10 kω
R10P2, R10N2=15 kω
R10P3, R10N3=100 kω
R10P4, R10N4=68 kω
TR10P, TR10N=2N495
DP, DN, D10=IN659A

When an upper section of the flip-flop circuit FF is on, current flows from the +9 volt terminal P1 of the rectifier through the upper transistor TR10P and through the resistor R10P1 to the −12 volt terminal N2, thus raising the potential of the upper terminal PT to almost +9 volts. At this time a small current flows through the base of transistor TR10P and resistors R10N2 and R10N1 to the −12 volt terminal N2. For this reason the voltage at the lower output terminal NT is nearly −3 volts. At this time the capacitor CP is charged to about +9 volts while the capacitor CN is charged to about −3 volts.

With the flip-flop circuit in this condition, when a positive pulse is applied to its input IN of sufficient magnitude, such as a positive pulse having an amplitude of about +10 volts, a voltage of +19 volts is steered by diode DP to the base of the upper transistor TR10P cutting off this transistor, thereby changing the potential of the upper output terminal PT from about +9 volts to about −3 volts. When this change occurs, a negative pulse is applied through the feedback resistor R10P2 to the base of the lower transistor TR10N, thus turning on the latter transistor. When this transistor turns on, current flows from the +9 volt terminal P1 through this transistor and through the resistor R10N1 to the −12 volt terminal N2, thereby raising the voltage of the lower output terminal NT from about −3 volts to about +9 volts.

When the next positive pulse is applied to the input terminal IN, a similar process ensues, thereby causing the voltages of the two terminals PT and NT to be reversed. This process repeats itself indefinitely each time a positive pulse is applied to the input terminal IN.

Resetting of the flip-flop circuit FF occurs only when the lower transistor TR10N is on, that is, only when a positive voltage appears at the lower output terminal NT and a negative voltage at the upper output terminal PT.

Such resetting occurs when a positive pulse is applied from a reset circuit through the reset diode D10 and through the diode DN to the base of the transistor TR10N. When a positive resetting pulse is applied to this base the transistor TR10 turns off, thus applying a negative voltage through the feedback resistor R10N2 through diode DP to the base of the upper transistor TR10P, thus turning the latter transistor on.

*Control switch units*

As illustrated in FIG. 11, a typical control switch unit G*k* is shown. It will be understood that *k* can assume all the values of either *i* or *j*, that is, any of the values 0 . . . 7. Each control switch unit is a negative AND gate having three input legs X, Y and Z which include three diodes DX, DY and DZ respectively. The cathodes of these diodes are connected through resistors R111 and R112 in series to a base *b*111 of a gating transistor TR111. The emitter *e*111 of the transistor TR111 is connected directly to the common reference terminal PR of the appropriate rectifier while its collector *c*111 is connected through two resistors R113 and R114 to the −12 volt terminal N2 of that power supply.

The junction J11 between the two resistors R111 and R115 is connected to the emitter *e*111 through a capacitor C113. The junction J11 is also connected to the −9 volt terminal N1 through a resistor R115. A second transistor TR112 is employed to amplify the signal developed by the gating transistor TR111. The base *b*112 of this transistor is connected to the junction between the resistors R113 and R114, while its collector *c*112 is connected through a resistor R116 to the +12 terminal P2. A clamping diode D11 is connected between the junction between resistors R111 and R112 and the collector C112 through a current-limiting resistor R117, the anode of the diode D11 being connected to the junction J11. The cathode of the diode D11 is connected to the emitter *e*111 through a bypass condenser C114.

With the control switch unit G*k*, a negative potential appears at the output terminal M*k* only when negative potentials are applied to all three inputs X, Y and Z, and a positive voltage appears at the output terminal M*k* whenever at least one of the potentials applied to the legs X, Y and Z is positive. Due to the action of the potential divider established by the resistors R111 and R115, the potential of the junction J11 is slightly positive when a positive voltage is applied to any of the gate leg inputs X, Y and Z. As a result, both the transistors TR111 and TR112 are thus cut off whenever a positive potential is being applied to one or more of the gate leg inputs X, Y, or Z.

The rise time of each of the control switch units G*k* at the inception of a negative signal at the output M*k* is made rapid compared with the return time at the termination of that signal. For this reason a control switch unit that is being turned on actually does turn on before another control switch unit that is being turned off actually is turned off. In this way, in effect, an action of the make-before-break type is attained. By virtue of the make-before-break action of the various signal control gates, the occurrence of switching spikes that otherwise might be impressed upon the load circuit, is avoided.

The make-before-break action is achieved in part by the diode D11. By virtue of this diode, whenever two of the gate leg inputs X, Y and Z have negative potentials applied thereto and a negative potential is then applied to the remaining gate leg input X, Y, or Z, this negative potential is applied quickly to the base *b*111, thus causing a large surge of current to flow from the emitter *e*111 to the collector *c*111 and through the resistors R113 and R114, thus driving the base *b*112 of the transistor TR112 positive and thereby causing a negative pulse to appear at the output terminal M*k*. On the other hand, when negative potentials are applied to all three gate leg inputs X, Y and Z, and a positive potential is then applied to one of them, the positive potential causes current to flow through the diode D11 thus delaying the application of the full positive potential to the base *b*111. As a result, a greater length of time is required to change the voltage of the output terminal M*k* from a negative value to a positive value than to change it from a positive value to a negative value. In effect, when a positive control signal is first applied to one of the gate leg inputs X, Y and Z, while all of them are positive, the two capacitors C113 and C114 act in parallel to cause the effective charging time to be a value K [(C113)+(C114)], but when two of the gate leg inputs X, Y and/or Z are negative and the third one is made negative, the charging is only through the capacitor C113, the charging time in this case being K (C113). In these two expressions (C113) and (C114) are the capacitance values of the capacitors C113 and C114 and K is simply a constant of proportionality.

Specifications and circuit constants for the elements of the control switch unit G*k* which may be employed in the practice of this invention are as follows:

D11, DX, DY, DZ=IN625
C113=470$\mu\mu fd.$
C114=560$\mu\mu fd.$
TR111=2N495
TR112=2N718
R111=15$k\omega$
R112=6.8$k\omega$
R113=3.5$k\omega$
R114=47$k\omega$
R115=20$k\omega$
R116=2.35$k\omega$ The transistor TR111 is of the pnp type, while the transistor TR112 is of the npn type.

When negative biases are applied from the output terminals of three flip-flop circuits to the corresponding input terminals X, Y and Z of one of the control switch units, the junction J11 of that control switch unit becomes negative. As a result, current flows from the reference terminal PR through the emitter terminal *e*111 of the transistor TR111 through the resistors R112 and R115 to the −9 volt terminal N1 thus turning on the resistor TR111. When the transistor TR111 is on a current also flows from the neutral terminal PR through the transistor and the load resistor R113 through the base *b*112 and out of the emitter *e*112 of the amplifying transistor TR112 to the −9 volt terminal N1. An amplified current developed by the transistor TR112 flows from the +12 volt terminal N2 through the resistor R116 and through the transistor TR112 to the −9 volt terminal N1, thus producing a negative voltage of about −9 volts at the output terminal M*k* of the control switch unit G*k*.

But when a positive voltage is applied to any of the input terminals X, Y, or Z of a control switch unit G*k* the junction J11 becomes slightly positive relative to the reference terminal PR thus cutting off the transistor TR111 and in turn cutting off the transistor TR112. When the latter transistor TR112 is off, a positive voltage of about +12 volts is developed at the output terminal M*k*.

It will be understood that each of the control switch units G0 . . . G7 of FIG. 9 is of the type represented by the control switch unit G*k* of FIG. 11 and that the outputs M0, M1 . . . M7 correspond to the output M*k* where, as previously *k*=0, 1 . . . 7. In effect *k*=*i* in the switch control units of the column switches CE and CF and *k*=*j* in the control switch units of the row switches RE and RF. But this does not mean that *i*=*j* always.

*Reset control*

In each of the matrix arrays of the electronic commutator of FIG. 5, it is possible to locate sixty-four (64) gate units SE*ij* and SF*ij* at 64 different locations so that any one of the 64 gate units can be opened at one time. It is often desirable to be able to periodically switch a different number of gate units fewer than 64 at regular intervals in order to avoid loss of signal transmission time when fewer than 64 signal sources S*ij* are in use. In accordance with this invention, reset gates SE74 and SF74 are employed together with a reset coupling circuit RCC to reset all of the flip-flop circuits FF to their 0 state whenever either of the reset gates SE74 or SF74 is opened by application of negative biases to the corresponding eighth column and fourth row. With the arrangement of this invention, all of the flip-flops are restored to their 0 state when a negative bias is applied to both the gate leg H and the gate leg G of either of the reset gates SE74 or SF74. When the flip-flops are thus reset negative biases are applied to the input legs of the two control switch gates SE00 and SF00 causing these gates to open.

Figure 12:
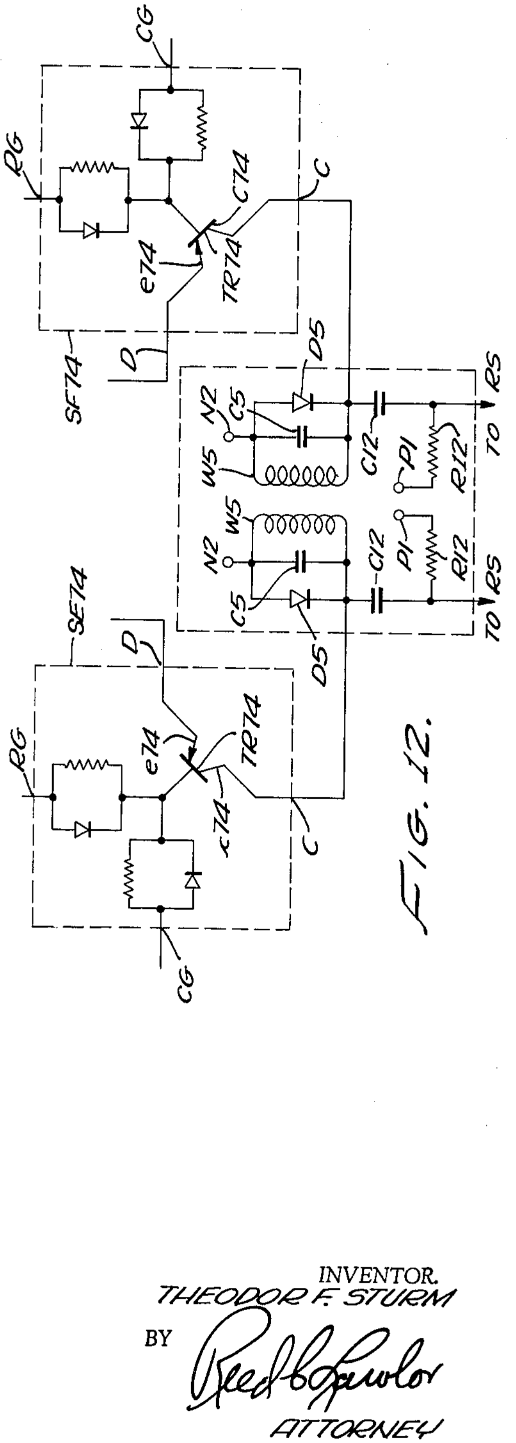
FIGURE 12 is a wiring diagram of the reset circuit arrangement employed in the electronic commutator of FIGURE 5.

The two reset gate units SE74 and SF74 are somewhat similar to the signal gate units SE*ij* and SF*ij* (where *ij*<74 of octal system) except, however, that their transistors TR74 are connected in normal manner between the terminals C and D as shown in FIG. 12 instead of in an inverted manner as shown in FIG. 6. Thus, the emitters *e*74 of the transistors TR74 of each reset gate unit SE74 and SF74 are connected to the terminals D which are in turn connected to the reference terminals PR of the corresponding rectifiers RRE and RRF, and the collectors *c*74 of the transistors TR74 are connected to the input terminals C. The reset coupling network includes a one-to-one transformer having two windings W5. One end of each of the windings is connected to the collector *c*74 of the transistor TR74 of the corresponding reset gate SE74 and SF74. The other end of each of the windings is connected to the −12 volt terminal N2 of the corresponding rectifier RRE or RRF as the case may be. Capacitors C5 are connected across the transformer windings W5 and a diode D5 is connected across each of the windings with the anode connected to the corresponding −12 volt terminal N2.

The collectors *c*74 are connected through coupling capacitors C12 to the corresponding reset terminals RS of the corresponding matrix scanning units MSE and MSF respectively. The reset terminals RS are connected through current-limiting resistors R12 to the −9 volt terminals P1 of the corresponding rectifiers RRE and RRF. The diodes D5 prevent ringing when the transistor reset gates are biased off.

The specification and values of various circuit elements of either of the gate units SE74 and SF 74 of the reset circuit that have been found suitable are as follows:

TR74=2N495
D5=IN625
C5=2000$\mu\mu$f.
C12=2000$\mu\mu$f.
R12=10k$\omega$

The diodes and resistors in the input legs of the gate units SE74 and SF74 are of the same type and have the same values as those in the input legs of the signal control gate units of FIG. 6.

With the reset system, including the two reset gate units SE74 and SF74 and reset coupling circuit RCC, whenever negative potentials are applied to both of the gate legs RG and CG of either of the reset gate units SE74 and SF74, a positive signal appears at its collector C74, thus being impressed upon the lower part of the corresponding primary winding W5. Due to the close mutual coupling between the two windings W5, a positive potential is also induced on the lower end of the other transformer winding, thus even though one of the reset gating switches SE74 or SF74 is operated before the other, positive pulses are applied through both of the coupling capacitors C12 to the reset termials RS of all of the flip-flop circuits FF. In this way, the cyclic action of both matrix arrays ME and MF are re-initiated simultaneously.

GENERAL DISCUSSION AND RESUME

In the foregoing description three specific embodiments of the present invention have been described. In the system of FIG. 1 the invention is applied to the switching of just one side of each of two signal transmission channels. In the system of FIG. 4 the switching is applied to both sides of each of two balanced channels. And in the system of FIG. 5 the switching is applied to matrix arrays of a large number of balanced channels. In all of the systems the power supply that is employed for biasing transistors on and off as desired in any one set of conductors that are connected to one side of the common electric unit are isolated from that unit and from any circuitry connected to the other side of that circuit whether that circuitry be simply in the form of a return ground conductor as in the case of FIG. 1 or whether it be in the form of signal control units as in the forms of the invention represented in FIGS. 4 and 5.

In the more practical form of the invention illustrated in FIG. 5 that is employed for selectively connecting any one of a very large number of signal sources to a single load by switching both sides of the transmission line in the signal channel connected with each signal source, the opening and closing of the gates in a predetermined sequence without introducing crosstalk or spurious signals is accomplished automatically not only by means of isolated power supplies but also by isolating a common clock pulse source from the matrix scanners associated with opposite sides of the load circuit and by means of isolated reset circuits.

Considering the invention in its broad aspect in the system of FIGS. 5 and 3, two complete sets of channel switching circuits are associated with two different terminals of the input circuit of a common load. All of the parts of each switching system are completely isolated from all of the parts of the other switching system except for the connections to the load circuit and to the sources. However, substantially no current flows through any off transistor, that is, in any closed channel. The switching systems connected to the different terminals of the input of the load circuit, in effect, float with those terminals. In this connection, it is to be noted that the reference or neutral terminal PR of the left D.C. power supply RRE is connected to the terminal E and forms a common reference potential level with respect to all components of the left matrix array and its associated scanner MSE and the left portions of the reset system shown in FIG. 12. Likewise, it is to be noted that the reference or neutral terminal PR of the right D.C. power supply RRF is connected to the terminal F and forms a common reference potential level with respect to all components of the right matrix array and its associated scanner MSF and the right portions of the reset system shown in FIG. 12. The two neutral terminals PR of the two rectifiers RRE and RRF thus float at the potentials of the terminals E and F respectively at the input of the load circuit. Consequently, with this arrangement cross-talk between signal channels is substantially eliminated. Cross-talk is not only avoided between channels but also between any channel and the switching system that opens and closes that channel. The reduction of cross-talk between the switching system and the signal channels is aided by virtue of the inverted connection of the transistors since offset voltages introduced by a transistor when on is very much smaller when the inverted connection is used than when the direct connection is used. Furthermore, the net voltage introduced into any signal channel at the time that any two corresponding signal control gate units SE*ij* and SF*ij* are opened is substantially nil, since the transistors in these gate units introduce mutually opposing voltages.

The connections between the D.C. power supply DCPS of FIG. 7 and the various parts of the electronic commutator have been described throughout by indicating the connections of various terminals of the D.C. power supply DCPS with various parts of the individual circuits. Thus, with respect to each side of the system shown in FIG. 5 and FIG. 13:

(1) The neutral or common terminal PR is connected to one input terminal of the load circuit and to one end of the corresponding secondary winding of an isolation transformer IE1 or IF1 of the clock pulse source thus establishing a reference voltage level for the gate units, and the scanners connected to the corresponding input terminal of the load circuit.

(2) Voltages of +12, +9 and −12 are applied by connection of the P2, P1 and N2 terminals of the rectifier RRE or RRF with each of the flip-flops on the same side of the system. These connections are indicated by the use of common symbols in FIG. 7, FIG. 10, and FIG. 13.

(3) Voltages of +12, −9, and −12 are applied by connection of the P2, N1 and N2 terminals of the rectifier with each of the control switch units G on the same side of the system. These connections are likewise indicated by the use of common symbols in FIG. 7, FIG. 11, and FIG. 13.

With this arrangement when a particular signal channel is open, such as one that includes a pair of corresponding signal gate units, such as a typical gate unit SE*ij* or SF*ij*, currents flow in the system as follows:

(1) A signal current flows from one end of the corresponding source S*ij* (see FIG. 5) into the input terminal C through its transistor TR and out of the output terminal D (see FIG. 6) of the signal control gate unit SE*ij* thence by an output line to the input terminal E of the load circuit through the input resistance of the load circuit and out of the other input terminal F of the load circuit, then by an output line to the output terminal D (see also FIG. 6) of the signal control gate unit SF*ij* through its transistor TR and out of the input terminal C of that gate unit to the other side of the signal source S*ij*. Actually, of course, the direction of flow of the current in the circuit just described depends upon the relative polarity of the voltages at the opposite sides of the signal source S*ij* and the current through the various elements just mentioned reverses when this polarity is reversed. The current that thus flows in an open channel is proportional to the voltage supplied by the corresponding signal source.

(2) Simultaneously, power for biasing on the transistors TR of the two signal control units SE*ij* and SF*ij* is supplied from the power supply. More particularly the power supply for biasing on the two gate units SE*ij* and SF*ij* are supplied from different rectifiers RRE and RRF, respectively. More particularly, when any specific signal gate unit SE*ij* is open, current flows from the neutral terminal PR of the rectifier on that side of the system through the output terminal D of that signal gate unit through the collector *c* and through the base *b* where it divides into two halves (see FIG. 6). One half flows through the resistor CK and the other half flows through the resistor RK. The two halves of the current flow through the output terminals M*i* and M*j* of the switch control units G*l* and G*j* respectively. The current flowing in either of the switch control units G*k* flows through the corresponding amplifier transistor TR112 (see FIG. 11) to the −9 volt negative terminal N1 of the rectifier on that side of the system.

On the other hand, when positive voltage is applied to one of the gating terminals such as the gating terminal CG and a negative voltage to the other terminal, such as the gating terminal RG, current flows through the gating terminal CG through the diode DIC through the resistor RG to the other gating terminal RF. Likewise, when a positive voltage is applied to the other gating terminal RG and a negative voltage is applied to the first mentioned terminal CG, current flows through the gating terminal RG through the diode DIR through the resistor CK to the first mentioned gating terminal CG. In either event the base of the transistor TR of the signal control gate unit becomes positive relative to its collector *c*, thus turning that transistor off. Likewise, when a positive voltage is applied to both of the gating terminals CG and RG the base *b* of the transistor of that gate unit becomes positive relative to the collector, thus turning off that transistor TR. In any of these cases when a positive potential is applied to the base of the transistor TR of that gating unit, that gating unit is closed against the transmission of signals through the terminals C and D.

From the foregoing it is seen that even in the complex network of FIG. 5 the biasing circuit that controls the various signal channels are substantially completely independent of the signal circuits. Thus, practically no cross-talk occurs between channels through the biasing circuits.

In the system illustrated in FIG. 5 and the subsidiary figures related thereto an arrangement has been provided in which the frequency of the inverter INV5 is much higher than the frequency of the clock pulse source CPS. It is often desirable that the frequency of oscillation of the inverter be high since this makes possible the use of isolation transformers IE2 and IF2 that are of lighter weight than otherwise.

Figures 13, 14:
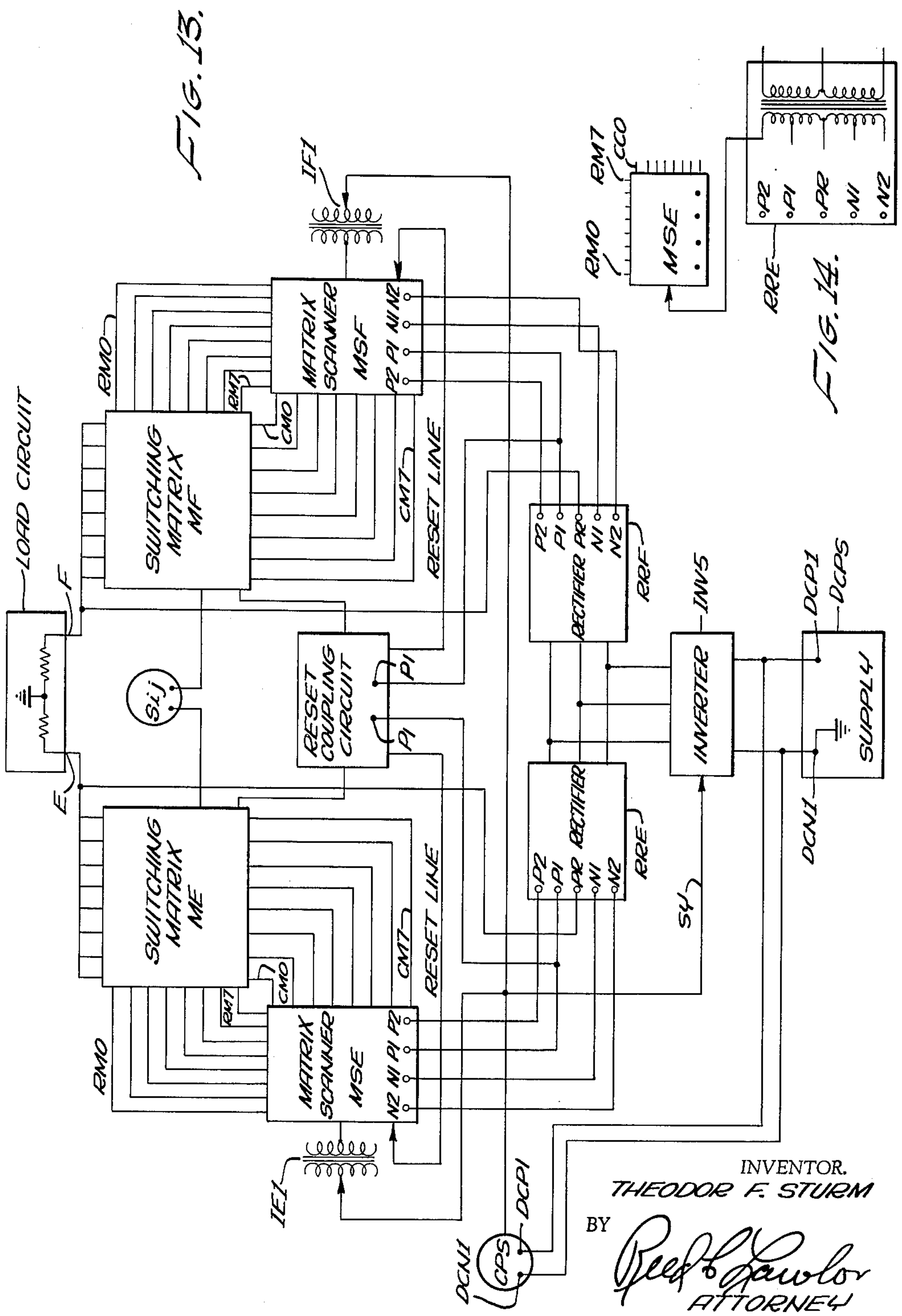
FIGURE 13 is a schematic diagram of another embodiment of the invention.
FIGURE 14 is a diagram of alternative means for transmitting pulses to the matrix scanners.

In some cases it is desirable to scan the matrix at a high frequency. Where the scanning may occur at a high frequency, the clock pulse signals may be derived from the inverter INV5 instead of from a separate clock pulse source. Thus, for example, as shown in FIG. 14, a connection is shown for transmitting positive-going pulses to the matrix scanners MSE and MSF from one end of the transformer of each of the rectifiers RRE and RRF respectively. It is to be noted that in this case, the isolation transformers IE1 and IF1 may be eliminated, the isolation being achieved by means of the power supply transformer IE2.

As explained above, the matrix scanner is designed to operate in the manner of a make-before-break switch. In this way the occurrence of spikes in the signals applied to the load circuit LC are minimized. In order to minimize the effects of spikes that might originate in the inverter the oscillation of the inverter may be synchronized with the oscillation of the clock pulse source as by means of a synchronization line SY leading from the clock pulse source to the inverter INV5 as indicated in FIGS. 5 and 13. An external source of pulses may also be used for synchronizing the clock pulse source or the inverter or both with each other and that external source.

Certain practical assumptions have been made in the foregoing description in order to avoid excessive circumlocution in the description. For example, where it is said that a positive pulse brings about a certain action, it is recognized that the magnitude of that pulse must exceed some minimum threshold below which a pulse would be ineffective for the intended purpose. Accordingly, where references are made to a positive pulse for performing a certain function it is meant to include only positive pulses of sufficient magnitude to accomplish the desired result, and below any magnitude above which the system might be disabled.

Since the techniques of producing pulses large enough to accomplish the desired results are well known, is seemed to be unnecessary to describe this characteristic of the pulses in detail. Similarly, very frequently descriptions have been given only of typical circuits and typical units and the operation of typical parts of the circuits has been described in detail. Similar circuits in other locations than those specifically referred to in the description are understood to operate in a similar way.

For convenience, a number of abbreviations have been used to simplify the description. Among these abbreviations are the following:

ω=ohms
kω=kilohms
mv.=millivolts
v.=volts
μfd.=microfarads
μμfd.=micromicrofarads
p.p.s.=pulses per second Furthermore, even though the collector of a transistor acts as an emitter and the emitter acts as a collector when the transistor is in the inverted connection, the terms collector and emitter have been used throughout to refer to the elements of the transistor which act as emitter and collector when the transistor is used in the normal or direct connection. An emitter used as a collector in the inverted connection is referred to as an inverted collector and a collector that is used as an emitter in the inverted connection is referred to as an inverted emitter.

In the specification, care has often been exercised to recognize that certain parts of the circuits are coupled to some small extent through the load circuit and the source. Complete insulation of such circuits from each other can be realized only by disconnecting the sources and the load circuit from the system under consideration. Accordingly, where two parts on opposite sides of a system are referred to as being isolated from each other, it is to be understood that there is no D.C. connection between them in the absence of a signal source and a load circuit. In other words, except for connections through the load circuit and the source, two parts which are isolated from each other are mutually insulated from each other so far as D.C. currents are concerned.

While the invention has been described with reference to certain specific embodiments thereof and while specific examples have been given for the values of various components and the designations of various components, it would be understood that the invention may be embodied in many, many other forms. More particularly, it will be understood that even though transistors are employed in the inverted connection in the best embodiment of the invention, some advantages of the invention may be obtained by employing transistors in the direct connection. Furthermore, the invention may be employed with switching systems in which the transistorized gate units SE*ij* and SF*ij* are arranged in a single row instead of in a square matrix and that other arrangements of signal control units and other numbers of signal control units may be employed in other matrix arrays. Furthermore, it will be understood that the invention may be practiced not only with transistors but with other devices which have the characteristics of transistors. It will also be understood that the signal control gates may be opened in some other sequence, and that in fact they may even be opened in a random sequence for some applications.

Additionally it will be understood that other forms of isolated power supplies may be employed. For example, two mutually insulated electric generators may be employed in place of the rectifiers RRE and RRF and the two generators may be driven by a common electric motor from which they are insulated.

Though the invention has been specifically described with reference to an electronic commutator in which a series of signal sources are periodically connected to a load circuit one at a time, it will be understood that the invention may also be employed in an arrangement in which each signal source is connected to a load circuit only once and that by suitable modification signals from different sources may be mixed deliberately by opening a plurality of signal control gates for those sources simultaneously while the gates in the channels of other sources are closed. In other words, while the invention is primarily directed to the elimination of cross-talk between any two channels, more broadly it is directed to the elimination of undesirable mixing of signals between channels, thus making it possible to mix signals from various sources deliberately without introducing cross-talk from other sources. Furthermore, the switching arrangement of this invention may be employed as a decommutator in which a signal source supplying a periodic sequence of signals is substituted for the load circuit of FIG. 5 and a plurality of load circuits are substituted for the sources of FIG. 5.

It is therefore to be understood that the invention is not restricted to the specific embodiments and specific examples disclosed herein but may be embodied in many other forms within the scope of the appended claims.

The invention claimed is:

1. In a multiple-channel signal transmission system:
a plurality of transistors each connected to a plurality of conductors respectively that form lines of corresponding signal transmission channels from a plurality of signal sources, each of said transistors having a base terminal and a collector terminal;
means for connecting one end of each conductor to a common circuit and the other end of each conductor to said collector terminal of one of said transistors;
D.C. power supply means having a neutral terminal connected directly to said conductors between said transistors and said common circuit; and
switching means for applying a voltage of predetermined polarity from said power supply to the base terminals of a selected number of said transistors and for simultaneously applying voltage of the opposite polarity from said power supply to the base terminals of the remaining transistors, whereby said selected number of transistors are turned on thereby opening the corresponding signal transmission channels between corresponding signal sources and said common circuit while the other transistors are cut off thereby closing the remaining channels.

2. A multiple-channel signal transmission system as defined in claim 1 wherein said D.C. power supply means comprises a source of alternating current, a rectifier, and an isolation transformer for feeding alternating current from said alternating current source to said rectifier, said rectifier being provided with such a neutral terminal.

3. In a multiple-channel signal transmission system:
a plurality of transistors each connected to a plurality of conductors that form lines of corresponding signal transmission channels from a plurality of signal sources, each of said transistors having a base terminal and a collector terminal;
means for connecting one end of each conductor to a common circuit and the other end of each conductor to said collector terminal of one of said transistors;
D.C. power supply means having a neutral terminal connected directly to said conductors between said transistor and said common circuit; and
switching means for applying a voltage of predetermined polarity from said power supply to the base terminal of one of said transistors and for simultaneously applying voltage of the opposite polarity from said power supply to the base terminals of the remaining transistors, whereby said one transistor is turned on thereby opening the corresponding signal transmission channel between its signal source and said common circuit while the other transistors are cut off thereby closing the remaining channels.

4. In a multiple-channel signal transmission system as defined in claim 3:
scanning means for periodically applying the voltage of said one polarity to each of said transistors in sequence one at a time.

5. In a multiple-channel signal transmission system as defined in claim 4 the improvement wherein said scanning means comprises a clock pulse source and an isolation transformer between said clock pulse source and said transistors.

6. In a multiple-channel signal transmission system:
a plurality of transistors each having an emitter terminal, a base terminal, and a collector terminal;
means for connecting all of said collectors to a common circuit;
means for connecting the emitter terminals of each transistor with a separate circuit corresponding to said each transistor;
D.C. power supply means having a neutral terminal connected directly to said collector terminals; and
means for applying a negative voltage from said power supply to the base terminals of a selected number of said transistors and for simultaneously applying a positive voltage from said power supply to the base terminals of the remaining transistors.

7. In combination:
a plurality of transistors each having an emitter terminal, a base terminal and a collector terminal;
means for connecting all of said collectors to a common circuit;
means for connecting the emitter terminals of each transistor with a separate circuit corresponding to said each transistor;
D.C. power supply means having a neutral terminal connected directly to said collector terminals; and
means for applying a negative voltage from said power supply to the base terminal of one of said transistors and for simultaneously applying a positive voltage from said power supply to the base terminals of the remaining transistors.

8. A switching circuit for a transmission line including:
a pair of conductors interconnecting a signal source circuit and a load circuit;
two transistors connected in the respective conductors, each of said transistors having an emitter terminal, a base terminal, and a collector terminal;
the emitter terminals being connected in the respective conductors to a pair of terminals of one of said circuits and the collector terminals being connected in the respective conductors to a pair of terminals of the other of said circuits;
a pair of mutually insulated D.C. power supply means each having a neutral terminal connected to one of the terminals other than the base terminals of the respective transistors; and
means for selectively applying positive and negative voltages from the respective D.C. power supply means to the base terminals of the respective transistors.

9. A switching circuit for a transmission line including:
a pair of conductors interconnecting a signal source and a load circuit;
two transistors connected in the respective conductors each of said transistors having an emitter terminal, a base terminal and a collector terminal;
the emitter terminals being connected in the respective conductors to a pair of terminals of one of said circuits and the collector terminals being connected in the respective conductors to a pair of terminals of the other of said circuits;
a pair of D.C. power supply means each having a neutral terminal connected to the collector terminals of the respective transistors; and
means for selectively applying positive and negative voltages from the respective D.C. power supply means to the base terminals of the respective transistors.

10. In combination:
first and second sets of transistors, each transistor having an emitter element, a base element and a collector element;
one transistor of each set being paired with a transistor of the other set;
a load circuit having a first terminal connected to the collector elements of the transistors of said first set and a second terminal connected to the collector elements of the transistors of said second set;
a plurality of signal sources each having two terminals and corresponding to the respective pairs of transistors, the two terminals of each signal source being connected respectively to the emitter elements of a corresponding pair of transistors;
first and second mutually insulated power supply means electrically isolated from each other and from the load circuit;
and first and second mutually insulated control switching means connected between said first and second power supply means respectively and said base elements for simultaneously selectively biasing only one pair of transistors on at a time, whereby signals are transmitted from only one signal source at a time to said load circuit.

11. A combination as set forth in claim 10 in which each of said power supply means includes a D.C. power supply having a positive terminal, a negative terminal and an intermediate terminal;
the intermediate terminal of the first power supply being connected to the collector elements of the transistors of said first set, the intermediate terminal of the second power supply being connected to the collector elements of the transistors of said second set;
said control switching means having a plurality of states corresponding to the respective pairs of transistors respectively, said first control switching means connecting the positive terminal of said first power supply means to the base element of the corresponding transistor of the first set and the negative terminal of said power supply means to the base element of the remaining transistors of said first set when said first control switch means is in the state corresponding to said one transistor of said first set, and
said second control switching means connecting the positive terminal of said second power supply means to the base element of the corresponding transistor of the second set and the negative terminal of said power supply means to the base element of the remaining transistors of said second set when said second control switch means is in the state corresponding to said one transistor of said second set.

12. A combination as set forth in claim 10 in which the first and second sets of transistors and the first and second control switching means are connected in first and second matrix arrays respectively,
each transistor of the first set and the control switching means associated therewith forming a signal gating unit in said first matrix array;
each transistor of the second set and the control switching means associated therewith forming a signal gating unit in said second matrix array;
first and second matrix scanning means connected to the control switching means of the first and second matrix arrays respectively for causing signals to be transmitted through only one pair of signal gating units at a time to said load circuit;
means connected to said first power supply means for energizing said first matrix scanning means; and
means connected to said second power supply means for energizing said second matrix scanning means.

13. A combination as set forth in claim 12 comprising a clock pulse source;
means including first and second mutually insulated means for transmitting pulses from said clock pulse source to said first and second matrix scanning means respectively for sequentially rendering one pair of signal gating units operative at a time for transmitting signals therethrough to said load circuit.

14. In a multiple-channel signal transmission system:

a plurality of pairs of lines interconnecting a common circuit and a plurality of circuits that correspond respectively with the pairs of lines, each pair of lines providing a separate transmission channel between said common circuit and the circuit that corresponds to the pair of lines forming said channel;

a pair of transistors connected in the respective lines of each channel, each of said transistors having a first end terminal, a base terminal, and a second end terminal;

the first end terminal of the transistors in one line of each channel being connected to one end of said common circuit;

the first end terminals of the transistors in the other line of each channel being connected to the other end of said common circuit;

a pair of mutually insulated D.C. power supply means, each power supply means having a neutral terminal, the neutral terminal of one D.C. power supply means being connected to said one end of said common circuit, the neutral terminal of the other D.C. power supply means being connected to said other end of said common circuit; and switching means including means for selectively applying positive voltage and negative voltage from one of the D.C. power supply means to the base terminals of the transistors having their first ends connected to said one end of said common circuit, said switching means also including means for sumultaneously selectively applying postive voltage and negative voltage from the other D.C. power supply means to the base terminals of the transistors having their first ends connected to said other end of said common circuit, whereby the transistors in a selected pair of lines are turned on and the transistors of the remaining pairs of lines are turned off.

15. A multiple-channel signal transmission system as defined in claim 14 in which said first end terminals are collector terminals.

16. A multiple-channel signal transmission system as defined in claim 14 wherein each of said D.C. power supply means comprises a common source of alternating current;

a rectifier; and an isolation transformer for feeding alternating current from said common alternating-current source to said rectifier, each of said rectifiers being provided with such neutral terminals.

17. A multiple-channel switching system comprising:

two matrix arrays each having $i$ columns and $j$ rows, the $i$th column of one array corresponding with the $i$th column of the other array and the $j$th row of one array corresponding with the $j$th row of the other array, an intersection of every row and column of one array corresponding with the intersection of every row and column of the other array;

a pair of signal control gate units connected at the corresponding intersections of the different arrays and a pair of reset gate units at one pair of intersections of the two matrix arrays;

a pair of matrix scanning means for simultaneously applying gating signals to corresponding rows and gating signals to corresponding columns of the respective matrix arrays whereby one corresponding pair of gate units is open at a time;

means for sequentially applying a series of pulses to said matrix scanners for automatically applying such gating signals to one pair of gate units at a time whereby said signal control gate units are operated one at a time and then one of the reset gate units is operated; and means controlled by the operation of said one reset gate unit for reinitiating the sequential operation of the signal control gate units of both said matrix arrays.

18. A multiple-channel switching system comprising:

a matrix array having $i$ columns and $j$ rows;

a signal control gate unit connected at certain intersections of the rows and columns;

matrix scanning means including a row switch and a column switch for selectively applying gating signals to the respective rows and columns whereby one gate unit is open at a time;

means for sequentially applying a series of pulses to said matrix scanning means for automatically operating one signal control gate unit at a time; and D.C. power supply means comprising a source of alternating current, a rectifier, and an isolation transformer for feeding alternating current from said alternating-current source to said rectifier;

said matrix scanning means including said switches being responsive to said pulses for operating one of said gate units at a time by application of voltage to said gate units, said scanning means including connections between said D.C. power supply means and said gate units such that said gate unit that is open is isolated from those that are closed.

19. In a multiple-channel signal transmission system having a circuit common to all said channels and a plurality of circuits individually associated with the respective channels:

a plurality of signal transmission lines for connecting each of the respective individual circuits to said common circuit, each of said lines including a separate conductor connecting one side of each of said plurality of circuits with one side of said common circuit;

each of said conductors including a gating unit that introduces a spurious D.C. voltage when said gating unit is open to complete a connection between the corresponding individual circuit and said common circuit;

means including voltage balance means connecting the other sides of said plurality of circuits with the remaining side of said common circuit for balancing out said spurious D.C. voltage; and switching means for selectively operating said gating units whereby a selected number of individual circuits may be connected to said common circuit and the remaining individual circuits are disconnected from said common circuit.

20. A multiple-channel signal transmission system as defined in claim 19, wherein each of said gating units comprises a transistor having an emitter terminal, a collector terminal, and a base terminal, the two terminals other than the base terminal of each transistor being connected by said respective each conductor to said common circuit and to said respective individual circuit; and wherein said switching means comprises voltage supply means and a plurality of switch devices for operating said respective gating units, each of said switch devices being connected between said one side of said common circuit and the base of the transistor in the respective gating unit, said gating units being insulated from the other side of said common circuit.

21. A multiple-channel switching system as defined in claim 19, wherein each of said gating units includes a plurality of input connectors and an output connector, each of said gating units comprising:

a transistor including a control element, connections between said control element and said input connectors for applying "on" switching voltages to said control element through said input connectors, means including a capacitor and a diode connected in series in the order named between a voltage source and said control element, said diode being polarized to delay a change in voltage of said control element when said transistor is biased on by application of "on" switching voltages to said input connectors more than when said "on" switching voltages are removed, and commutating means for simultaneously applying switching voltages to and removing switching voltages from the input connectors of said gating units, whereby gating units are opened and closed in a predetermined sequence with an open-before-close action.

22. A multiple-channel switching system as defined in claim 19, wherein each of said gating units comprises:

a transistor including an emitter, a collector, and a base energized to provide a switching action, each of said gating units having a plurality of input connectors and an output connector, means including a pair of resistors connected in series between said base and said input connectors for applying "on" switching voltages to said base through said input connectors, means including a capacitor and a diode connected in series in the order named between a voltage source and the junction between said two resistors, said diode being polarized to delay a change in voltage of said base when said transistor is biased on by application of "on" switching voltages to said input discharge connectors more than when said "on" switching voltages are removed, and a commutating means for simultaneously applying switching voltages to and removing switching voltages from the input connectors of said gating units whereby gating units are opened and closed in a predetermined sequence with an open-before-close action.

23. In a multiple-channel signal transmission system having a circuit common to all said channels at one end of each channel and a plurality of circuits individually associated with the respective channels at the other ends thereof:

a plurality of signal transmission lines, each including a pair of conductors, for connecting each of the respective individual circuits with a corresponding pair of terminals of said common circuit;

a plurality of pairs of gating elements connected in the respective conductors included in the respective transmission lines, each of said gating elements introducing a spurious D.C. voltage in the respective transmission lines when said each gating element is open to provide a connection between the corresponding respective individual circuits and said common circuit, the voltages introduced by said switching elements in each corresponding pair of conductors being of opposite polarity and of substantially the same magnitude; and means for selectively operating pairs of gating elements whereby selected transmission lines may be opened while the remaining transmission lines remain closed.

24. A multiple-channel switching system comprising: two matrix arrays each having $i$ columns and $j$ rows, the $i$th column of one array corresponding with the $i$th column of the other array and the $j$th row of one array corresponding with the $j$th row of the other array, an intersection of every row and column of one array corresponding with the intersection of every row and column of the other array;

a plurality of corresponding pairs of signal control gate units, each pair of which are connected at different corresponding intersections of the two arrays and a pair of reset gate units at one pair of corresponding intersections of the two matrix arrays;

a pair of matrix scanning means for simultaneously applying gating signals to corresponding rows and gating signals to corresponding columns of the respective matrix arrays whereby one corresponding pair of gate units is open at a time;

sequencing means for sequentially applying a series of pulses to said matrix scanners for automatically applying such gating signals to said pairs of gate units in a predetermined sequence and then operating said reset gate units upon completion of said sequence; and resetting means controlled by such operation of either of said reset gate units for reinitiating the sequential operation of said sequencing means.

said resetting means comprising coupling means interconnecting said reset gate units to both of said matrix scanning means for reinitiating the sequential operation of said sequencing means upon the first operation of either of said reset gate units upon completion of said operating sequence.

25. In a multiple-channel signal transmission system having a circuit common to all said channels and a plurality of circuits individually associated with the respective channels at the other ends thereof:

a plurality of signal transmission lines for connecting each of the respective individual circuits to said common circuit, a gating unit in each of said transmission lines, each of said gating units including a plurality of input connectors and an output connector, each of said gating units comprising:

a transistor including a control element, connection between said control element and said input connectors for applying "on" switching voltages to said base through said input connectors;

means including a capacitor and a diode connected in series in the order named between a voltage source and said control element, said diode being polarized to delay a change in voltage of said control element when said transistor is biased on by application of "on" switching voltages to said input discharge connectors more than when said "on" switching voltages are removed, and means for simultaneously applying switching voltages to and removing switching voltages from the input connectors of said gating units, whereby gating units are opened and others are closed with an open-before-close action.

References Cited by the Examiner

UNITED STATES PATENTS

| | | | |
|---|---|---|---|
| 2,627,039 | 1/1953 | MacWilliams | 340—166 |
| 2,889,537 | 6/1959 | Elliott | 340—166 |
| 2,992,409 | 7/1961 | Lawrence | 340—166 |
| 3,089,091 | 5/1963 | Lindenthal | 340—166 XR |

OTHER REFERENCES

Publication: "32 Channel High-Speed Commutator," by Norman Alpert et al., Electronics, November 1953, vol. 23, Issue No. 11, pp. 94–97.

NEIL C. READ, *Primary Examiner.*